United States Patent [19]

Sawanobori

[11] Patent Number: 5,956,086
[45] Date of Patent: Sep. 21, 1999

[54] IMAGE INDICATING DEVICE AND IMAGING DEVICE

[75] Inventor: Keiji Sawanobori, Tokyo, Japan

[73] Assignee: Asahi Kogaku Kogyo Kabushiki Kaisha, Tokyo, Japan

[21] Appl. No.: 08/725,707

[22] Filed: Oct. 4, 1996

[30] Foreign Application Priority Data

Oct. 6, 1995 [JP] Japan .................................. 7-286421

[51] Int. Cl.[6] .................................................. H04N 3/14
[52] U.S. Cl. ......................................................... 348/273
[58] Field of Search ................................... 348/333, 334, 348/273, 275, 280, 242, 760, 761; 345/88; 349/112, 79

[56] References Cited

U.S. PATENT DOCUMENTS

| | | | |
|---|---|---|---|
| 4,213,145 | 7/1980 | Nagumo | 348/280 |
| 4,663,661 | 5/1987 | Weldy et al. | 348/242 |
| 4,740,828 | 4/1988 | Kinoshita | 348/222 |
| 4,876,590 | 10/1989 | Parulski | 348/333 |
| 4,920,409 | 4/1990 | Yamagishi | 348/791 |
| 5,107,353 | 4/1992 | Okumura | 345/96 |
| 5,119,180 | 6/1992 | Okamoto | 348/273 |
| 5,144,288 | 9/1992 | Hamada et al. | 349/109 |
| 5,150,204 | 9/1992 | Yamazaki | 348/275 |
| 5,264,939 | 11/1993 | Chang | 348/322 |
| 5,341,151 | 8/1994 | Knapp | 345/88 |
| 5,374,956 | 12/1994 | D'Luna | 348/275 |
| 5,479,207 | 12/1995 | Degi et al. | 348/312 |
| 5,619,225 | 4/1997 | Hashimoto | 345/88 |
| 5,621,487 | 4/1997 | Shirochi | 349/112 |
| 5,654,777 | 8/1997 | Shin | 348/793 |

OTHER PUBLICATIONS

A Copy of pp. 101–103 of "CCD Camera Technology", 1st ed. Radio Gijitsu Sha, Tokyo, Japan, Nov. 3, 1986, along with an English Translation thereof.

*Primary Examiner*—Wendy Garber
*Assistant Examiner*—Aung S. Moe
*Attorney, Agent, or Firm*—Greenblum & Bernstein, P.L.C.

[57] ABSTRACT

The image indicating device has an LCD on which a first color filter is provided, and a CCD on which a second color filter is provided. In the first color filter, a color filter element of one of said three primary colors is disposed on each of the dots in such a manner that the three primary colors are arranged in a delta-arrangement. A number of pixels of the CCD, which are arranged in a matrix, is double a number of dots of the LCD. In the first and second horizontal lines of the second color filter, adjacent pairs of color filter elements having the same color are arranged in a vertical direction, and in the third and fourth horizontal lines of the second color filter, adjacent pairs of color filter elements having the same color are arranged in a horizontal direction.

29 Claims, 28 Drawing Sheets

[LCD]

[CCD]

[LCD]

[CCD]

[LCD]

[CCD]

[LCD]

[CCD]

IMAGE INDICATING DEVICE AND IMAGING DEVICE

BACKGROUND OF THE INVENTION

1. Field of the Invention

The present invention relates to an electronic camera, and especially to a device for indicating an image by a liquid crystal display, the image being obtained by a solid state imaging device.

2. Description of the Related Art

Conventionally, there is known an electronic camera in which a color image obtained by a solid state imaging device is indicated by a liquid crystal display. On the other hand, as a color filter provided on the liquid crystal display used for a monitor device and the like, there is known a so-called delta-arrangement filter. The filter is constructed in such a manner that red (R), green (G) and blue (B) filter elements are disposed on the vertexes of a triangle. The filter has an advantage that resolutions, of an image indicated by a liquid crystal display, are high in a horizontal, vertical, and oblique direction, respectively.

Conventionally, there is no solid state imaging device provided with a color filter having a delta-arrangement, and a conventional imaging device is provided with a complementary color filter composed of magenta (Mg), green (G), yellow (Ye), and cyan (Cy) which are arranged in a matrix so that the arrangement conforms to the arrangement of the photodiodes of the imaging device. However, when a color image obtained by the imaging device, having the complementary color filter, is indicated by a liquid crystal display, having a color filter of the delta-arrangement, a circuit, for performing the complementary-color to primary-color rectification and so on, should be provided since the photodiodes of the imaging device do not correspond to dots of the liquid crystal display. Accordingly, this causes the size of the circuit mounted in the electronic camera to be large, and the cost of the camera to be expensive.

SUMMARY OF THE INVENTION

Therefore, an object of the invention is to provide an image indicating device, in which the size of the circuit mounted in the electronic camera does not have to be large, while allowing the cost to be restrained.

According to the present invention, there is provided an image indicating device comprising a display having dots by which an image is formed, and an imaging device having pixels which are arranged in a matrix.

The display is provided with a first color filter in which a color filter element of one of three different colors is disposed on each of the dots in such a manner that the three different colors are arranged in a delta-arrangement. The number of pixels is larger than the number of dots. The imaging device is provided with a second color filter in which a color filter element of one of the three different colors is disposed on each of the pixels in such a manner that the colors of the color filter elements of a group of adjacent pixels in the second color filter are the same, and the color of the color filter elements of the group is the same as the color filter element of a corresponding dot of the display, the corresponding dot corresponding to the center-point of the group.

Further, according to the present invention, there is provided an image indicating device comprising a display having dots by which an image is formed, and an imaging device having pixels which are arranged in a matrix.

The dots are aligned in horizontal lines including odd numbered lines and even numbered lines. The dots contained in the odd numbered lines are offset from the dots contained in the even numbered lines by a half width of one dot. A first color filter element of one of three different colors is disposed on each of the dots in such a manner that the color of any specified first color filter element is different from the colors of the six first color filter elements surrounding the specified first color filter element. The second color filter element of one of the three different colors is disposed on each of the pixels in such a manner that the colors of the second color filter elements disposed on a group of adjacent pixels are the same, and the color of the color filter elements of the group of adjacent pixels is the same as the first color filter element of a corresponding dot of the display, the corresponding dot corresponding to the center-point of the group of adjacent pixels.

Furthermore, according to the present invention, there is provided photodiodes corresponding to pixels which are arranged in a matrix, and color filter elements having a plurality of first, second, and third groups.

The colors of the color filter elements of the first, second, and third groups are the same, respectively. The color filter elements included in each of the groups are provided on photodiodes which are adjacent to each other. The color filter elements are disposed on the pixels in such a manner that the first, second, and third groups are arranged in a sequential manner, according to color, in a horizontal direction. A center-point of each of the groups included in a first horizontal line is offset by at least one photodiode from a center-point of each of the groups included in a second horizontal line which is adjacent to the first horizontal line.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
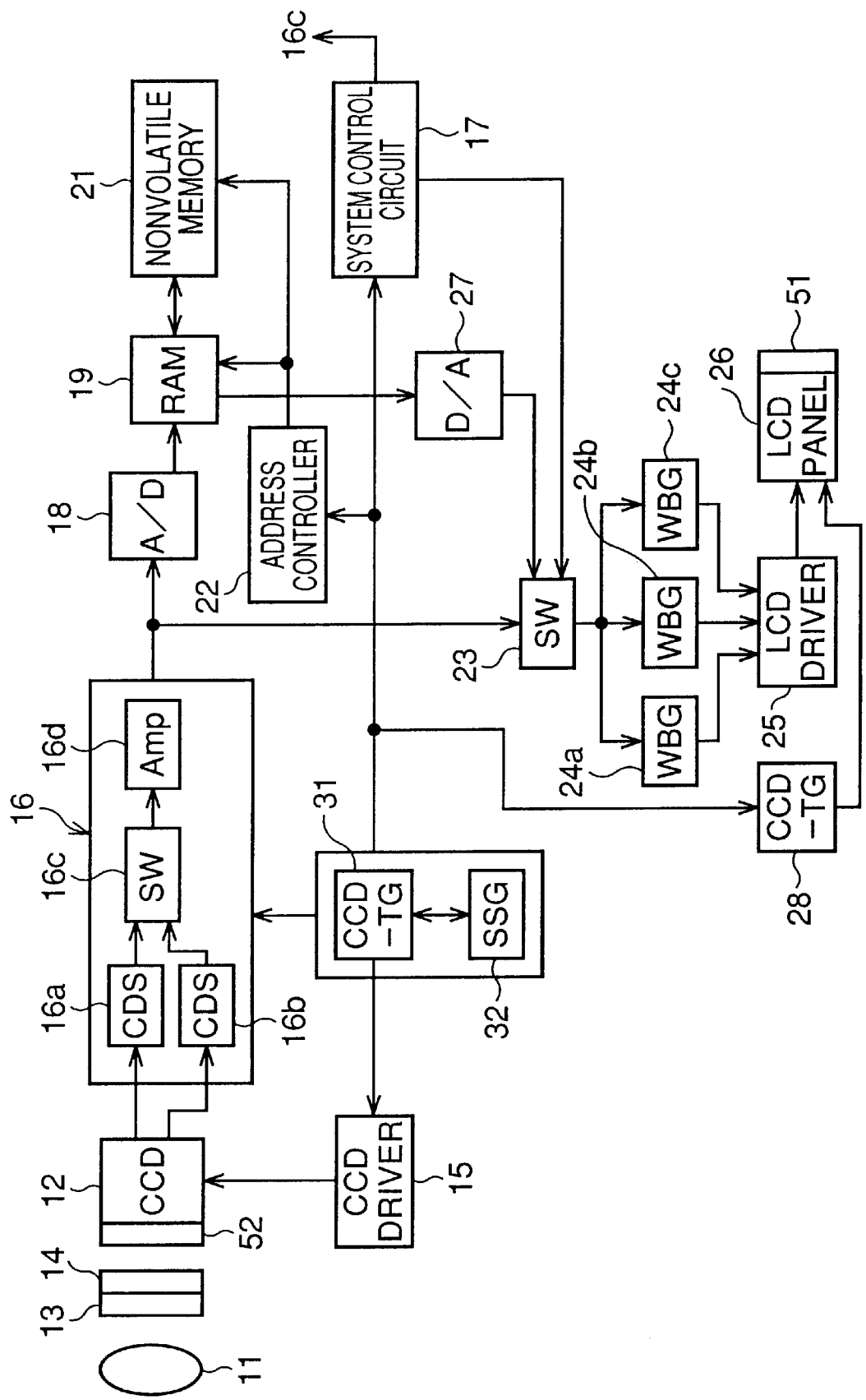
FIG. 1 is a block diagram showing a circuit of an electronic camera having an image indicating device of a first embodiment of the present invention.

The present invention will be described below with reference to various embodiments shown in the drawings.

FIG. 1 is a block diagram showing a circuit of an electronic camera having an image indicating device of a first embodiment of the present invention.

An infrared-cut-filter 13 and an optical low-pass-filter 14 are provided between a photographing optical system 11 and a solid state imaging device (CCD; charge coupled device) 12, so that an object image is formed on the CCD 12. Pixel signals corresponding to the image are outputted from the CCD 12 and are transmitted to a liquid crystal display 26 through circuits described below so that the image is indicated by the liquid crystal display 26. The liquid crystal display 26 is provided with a first color filter 51, and the CCD 12 is provided with a second color filter 52.

The CCD 12 is of a two-line parallel reading type such that each pixel is independently read. Namely, in the CCD 12, each pixel signal generated in the photodiodes is transferred to the horizontal transfer CCD without being combined with other pixel signals in the vertical transfer CCD, and pixel signals of two horizontal lines are simultaneously outputted from the CCD 12. The CCD 12 is driven by a CCD driver 15, so that the pixel signals are read out from the CCD 12 and inputted into a signal process circuit 16. The CCD driver 15 is operated in accordance with a timing signal and the other signals which are generated by a CCD timing signal generating circuit 31, which generates the timing signal based on a horizontal synchronizing signal and a vertical synchronizing signal outputted by a synchronizing signal generation circuit 32.

The signal processing circuit 16 has first and second correlated double sampling (CDS) circuit 16a and 16b, a switch 16c and an amplifier 16d. Regarding pixel signals of two horizontal lines outputted by the CCD 12, the pixel signals included in a first horizontal line are inputted into the first CDS circuit 16a, and the pixel signals included in a second horizontal line are inputted into the second CDS circuit 16b. The pixels signals are subjected to the correlated double sampling in the CDS circuits 16a and 16b, and are inputted into the amplifier 16d through the switch 16c. The switch 16c is controlled by a system control circuit 17 having a computer, so that one of the first and second CDS circuits 16a and 16b is selectively connected to the amplifier 16d.

The pixel signals outputted by the signal processing circuit 16, i.e. the amplifier 16d, are converted to digital signals by an A/D converter 18. The digital pixel signals are temporarily stored in a RAM 19, and then are stored in a nonvolatile memory 21. Address control in each of the RAM 19 and the nonvolatile memory 21 are carried out by an address controller 22 operated under control of the system control circuit 17. The address controller 22 is operated based on the synchronizing signal outputted by a synchronizing signal generation circuit 32.

While the pixel signals output by the signal processing circuit 16 are directly supplied to a switch 23, the pixel signals stored in the nonvolatile memory 21 are supplied to the switch 23 through the RAM 19 and a D/A converter 27. An output terminal of the switch 23 is connected to first, second, and third white balance adjustment circuits 24*a*, 24*b*, and 24*c* output terminals of which are connected to an LCD driver 25. Namely, the pixel signals outputted by the signal processing circuit 16 and the pixel signals stored in the nonvolatile memory 21 can be supplied to the LCD 26 through the LCD driver 25.

The switch 23 is controlled by the system control circuit 17. Namely, the switch 23 is switched to the signal processing circuit 16 when the pixel signals outputted by the signal processing circuit 16 are transmitted to the LCD 26, and is switched to the D/A converter 27 when the pixel signals stored in the nonvolatile memory 21 are transmitted to the LCD 26.

The first, second and third white balance circuits 24*a*, 24*b*, and 24*c* are provided for performing gain adjustments to red (R), green (G) and blue (B) components, respectively. The pixel signals output by the first, second, and third white balance circuits 24*a*, 24*b*, and 24*c* are input to the LCD 26 through the LCD driver 25. The LCD 26 is operated based on a horizontal synchronizing signal and a vertical synchronizing signal outputted by a synchronizing signal generating circuit 28, so that a color image is indicated on the surface of the LCD 26. The LCD timing signal generating circuit 28 is operated based on the synchronizing signal output by the synchronizing signal generating circuit 32.

Figure 2:
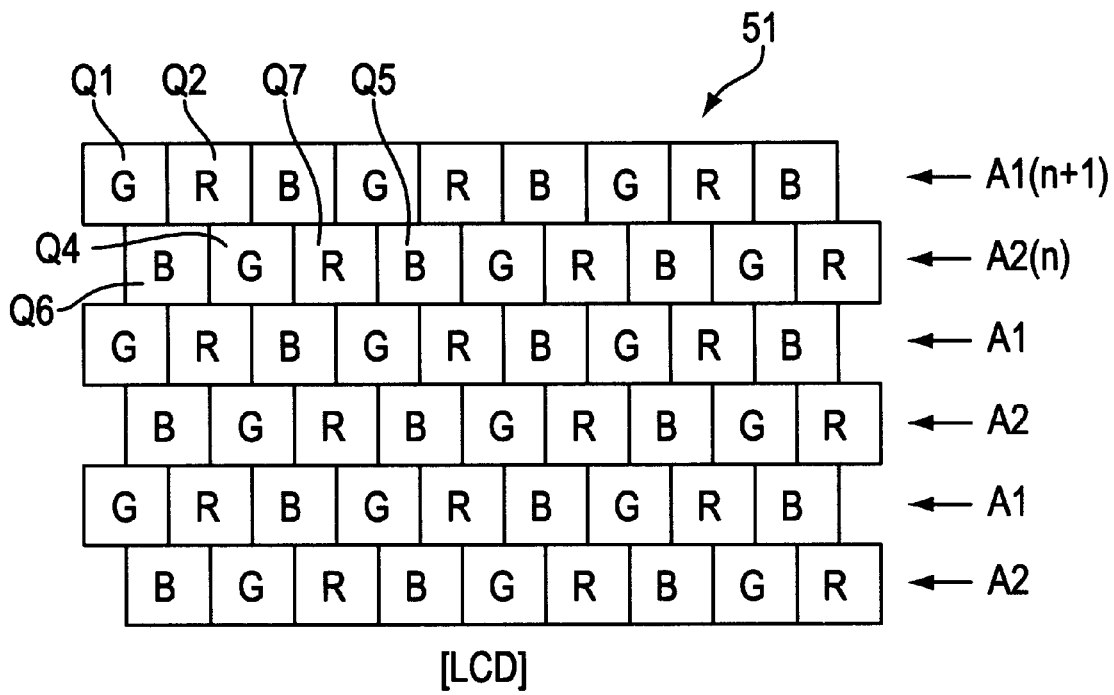
FIG. 2 is a view showing an arrangement of color filter elements of a first color filter provided on an LCD.
Figure 3:
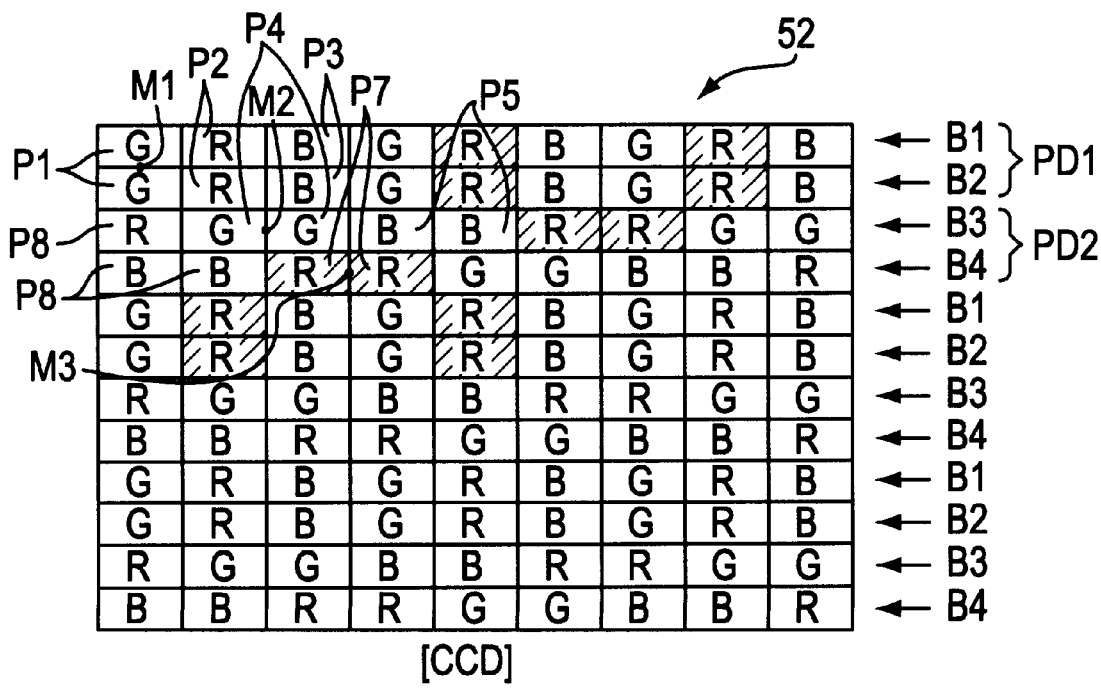
FIG. 3 is a view showing an arrangement of color filter elements of a second color filter provided on a CCD.

FIG. 2 shows an arrangement of color filter elements of the first color filter 51 provided on the LCD 26, and FIG. 3 shows an arrangement of color filter elements of the second color filter 52 provided on the CCD 12.

The LCD 26 has dots by which an image is formed, and the dot is the minimum indicating area corresponding to one cell of the first color filter 51. In the first color filter 51, a color filter element of one of the three primary colors is disposed on each of the dots in such a manner that the three primary colors are arranged in a delta-arrangement. Namely, in a first horizontal row A1, the color filter elements are arranged in the order of G, R, B from left to right. In a second horizontal row A2 which is positioned adjacent to the lower side of the first horizontal row, B is provided at a position between G and R of the first horizontal row A1, G is provided at a position between R and B of the first horizontal row A1, and R is provided at a position between B and G of the first horizontal row A1. Namely, the first and second horizontal row A1 and A2 are offset in horizontal direction by one and a half dots (i.e., 1.5 pitch).

The CCD 12 has photodiodes corresponding to pixels which are arranged in a two-dimensional matrix. Namely, the photodiodes are arranged in rows and columns, and are not arranged in the delta-arrangement. A number of the pixels of the CCD 12 is approximately double a number of the dots of the LCD 26. In the second color filter 52, a color filter element of one of the three primary colors is disposed on each of the pixels of the CCD 12. In first and second horizontal lines B1 and B2, the color filter elements are arranged in the order G, R, B, G, R, B from left to right. In a third horizontal line B3, the color filter elements are arranged in the order R, G, G, B, B, R from left to right, and in a fourth line B4, the color filter elements are arranged in the order B, B, R, R, G, G from left to right.

In the CCD 12, the first horizontal row A1 of the LCD 26 corresponds to the first horizontal line B1 and the second horizontal line B2 which is adjacent to the first horizontal line B1. The second horizontal row A2 of the LCD 26 corresponds to the third horizontal line B3 and the fourth horizontal line B4 which is adjacent to the third horizontal line B3.

The colors of color filter elements of certain adjacent pairs of pixels in the second color filter 52 are the same. For example, in the first and second horizontal lines B1 and B2, the color filter elements of the two pixels shown by reference P1 are G, the color filter elements of the two pixels shown by reference P2 are R, and the color filter elements of the two pixels shown by reference P3 are B. In the third horizontal line B3, the color filter elements of the two pixels shown by reference P4 are G, and the color filter elements of the two pixels shown by reference P5 are B. In the fourth horizontal line B4, the color filter elements of the two pixels shown by reference P6 are B, and the color filter elements of the two pixels shown by reference P7 are R.

Dot Q1 on the first horizontal row A1 of the LCD 26 corresponds to the pixels P1 on the first and second horizontal lines B1 and B2 of the CCD 12. Similarly, the dot Q2 on first horizontal row A1 corresponds to the pixels P2 on the first and second horizontal lines B1 and B2 of the CCD 12. Namely, on the CCD 12, the two pixels corresponding to each of the dots on the first horizontal row A1 are arranged in a vertical direction. Further, on the CCD 12, one of the two pixels corresponding to each of the dots on the first horizontal row A1 is contained in the first horizontal line B1, and the other of the two pixels is contained in the second horizontal line B2.

On the other hand, dot Q4 on the second horizontal row A2 of the LCD 26 corresponds to the two pixels P4 on the third horizontal line B3 of the CCD 12, and dot Q5 on the second horizontal row A2 corresponds to the two pixels P5 on the third horizontal line B3. Similarly, dot Q6 on second horizontal row A2 of the LCD 26 corresponds to the two pixels P6 on the fourth horizontal line B4 of the CCD 12, and dot Q7 on the second horizontal row A2 corresponds to the two pixels P7 on the fourth horizontal line B4. Namely, on the CCD 12, the two pixels corresponding to each of the dots on the second horizontal row A2 are arranged in a horizontal direction. Further, on the CCD 12, the two pixels on the third horizontal line B3 and the two pixels on the fourth horizontal line B4 are offset in a horizontal direction by one pixel.

Dot Q6, for example, of the even numbered row A2 of the LCD 26 is offset by half a dot (i.e., 0.5 pitch) in a horizontal direction relative to dots Q1 and Q2 of the odd numbered row A1. Q6 corresponds to the R element of the pixel P8, the G element positioned at left side of the two pixels P4, and the B element of the two pixels P6. Therefore, in a positional relationship between dot Q6 and the color filter of the CCD 12, if these four pixels corresponding to Q6 are simply added to each other to generate a signal corresponding to dot Q6 having B filter element, the generated signal will include the G component and the R component which are extraneous and useless for obtaining a pure B signal. Namely, a deterioration of the image quality is caused by mixing the components of G and R elements with the B signal.

However, in this embodiment, the two B element pixel signals of pixels P6 are separated from the R and G element pixel signals so that only the two pixel signals of a B element are read from the CCD 12 in accordance with a transfer control of electric charge in the CCD 12, as described later. Thus, the color of the dot of the LCD 26 is coincident with the color of the pixels of the CCD 12, which pixels correspond to the dot, so that the quality of the image indicated by the LCD 26 is improved.

Thus, the colors of the color filter components provided on the two pixels (two pixels of reference P1, for example), which are included in the first and second horizontal lines B1 and B2 and are adjacent to each other in a vertical direction, are the same as that of the color filter element which is provided on the corresponding dot (reference Q1, for example) of the LCD 26, which corresponding dot corresponds to center-point M1 of the two pixels. Further, the colors of the color filter elements provided on the two horizontally adjacent pairs of pixels (references P4 and P7, for example), which are included in the third and fourth horizontal line B3 and B4, are the same as that of the color filter elements which are provided on corresponding dots (references Q4 and Q7, for example) of the LCD 26, which corresponding dots correspond to the center-points of the pairs of pixels (references M2 and M3, for example).

To illustrate the arrangement of the color filter elements of the CCD 12, three groups of the color filter elements, having the same color, and which are arranged in a U-shape in lines B1, B2, and B3, have been cross-hatched. A group of color filter elements, having the same color, and which are arranged in an inverted U-shape in lines B4, B1, and B2, are also cross-hatched. These U-shape and inverted U-shape arrangement patterns appear alternately from top to bottom in FIG. 3. Such an arrangement of the color filter of the CCD 12 is coincident with that of the delta-arrangement of the LCD 26.

Figure 4:
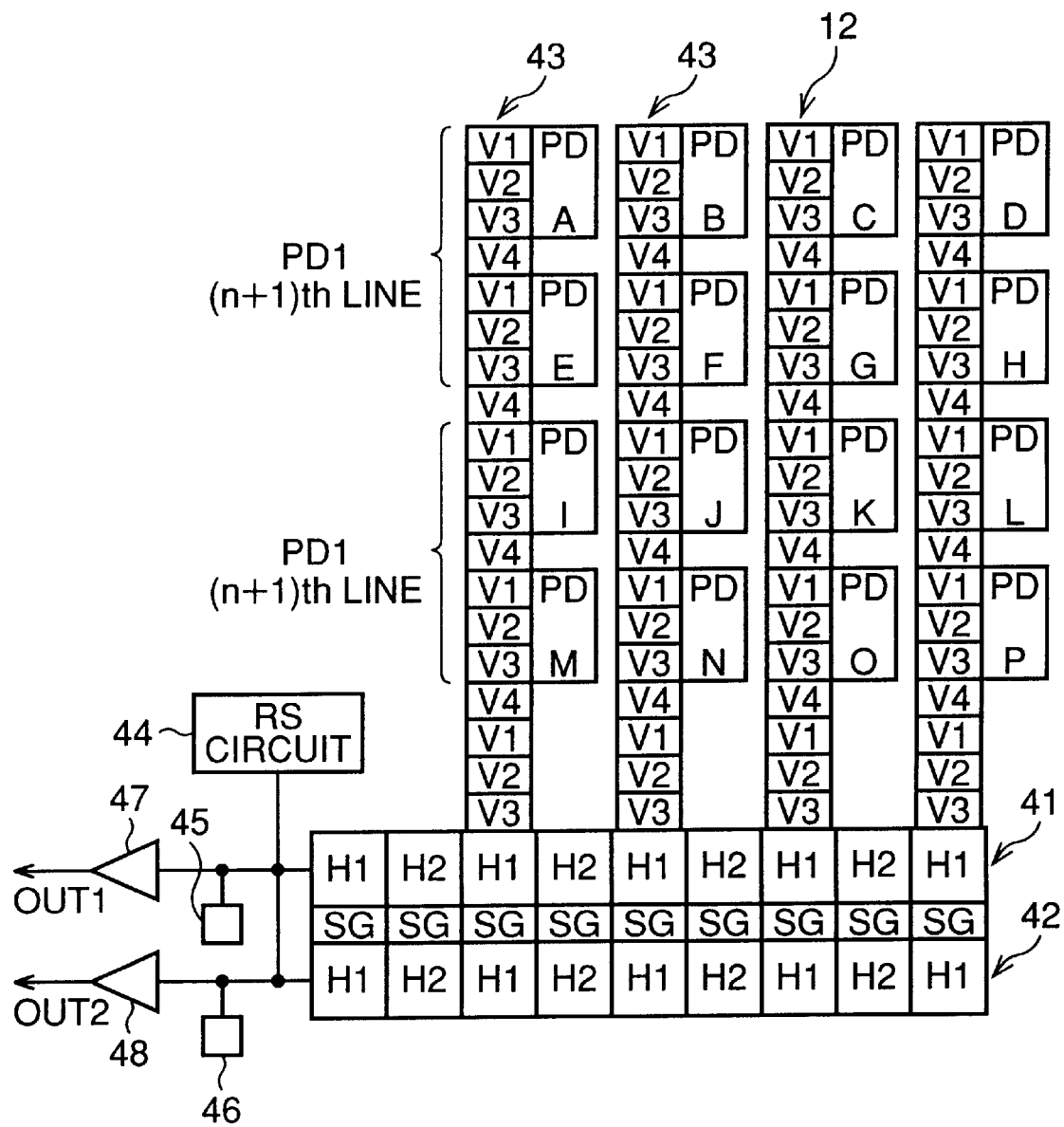
FIG. 4 is a view showing a construction of the CCD.

FIG. 4 shows a construction of the CCD 12. For simplification, the photodiodes, the vertical transfer CCD, and other components, are only partially indicated in the drawing.

The CCD 12 has a first horizontal transfer CCD 41 and a second horizontal transfer CCD 42. Four electrodes V1 through V4 are connected to one photodiode PD, so that pixel signals A through P obtained by the photodiodes PD are transferred independently of each other by the vertical transfer CCD 43 and are supplied to the horizontal transfer CCDs 41 and 42. Based on the pixel signals A, B, C, D, E, F, G, and H generated by the photodiodes PD1 forming two lines extending in a horizontal direction, a dot signal of the (n+1)th horizontal row A1 on the LCD 26 is generated. Based on the pixel signals I, J, K, L, M, N, O, and P generated by the photodiodes PD2 forming two lines extending in a horizontal direction, a dot signal of the (n)th horizontal row A2 on the LCD 26 is generated.

Regarding the order in which a pixel signal is read out from the CCD 12, the pixel signal corresponding to the (n)th row is first read out and then the pixel signal corresponding to the (n+1)th row is read out. In the LCD 26, the dot of the (n)th row is first driven and then the dot of the (n+1)th row is driven.

Each of the horizontal transfer CCDs 41 and 42 has first and second electrodes H1 and H2 which are alternately arranged, and shift gate electrodes SG are provided between the horizontal transfer CCDs 41 and 42. In the CCD 12, when the shift gate electrode SG is turned OFF, a potential barrier by which the horizontal transfer CCDs 41 and 42 are separated from each other is formed, and when the shift gate electrode SG is turned ON, the potential barrier is removed.

A reset circuit 44, electric-charge/electric-voltage conversion capacitors 45 and 46, and output buffers 47 and 48 are connected to output terminals of the horizontal transfer CCDs 41 and 42. Two pixel signals outputted from the first horizontal transfer CCD 41 are combined with each other by the electric-charge/electric-voltage conversion capacitors 45. Two pixel signals outputted from the second horizontal transfer CCD 42 are combined with each other by the electric-charge/electric-voltage conversion capacitors 46. The combined pixel signals are converted into voltage signals by the electric-charge/electric-voltage conversion capacitors 45 and 46, and are inputted into the CDS circuits 16a and 16b through the output buffers 47 and 48. The electric charges accumulated in the electric-charge/electric-voltage conversion capacitors 45 and 46 are reset by an operation of the reset circuit 44.

Figure 5:
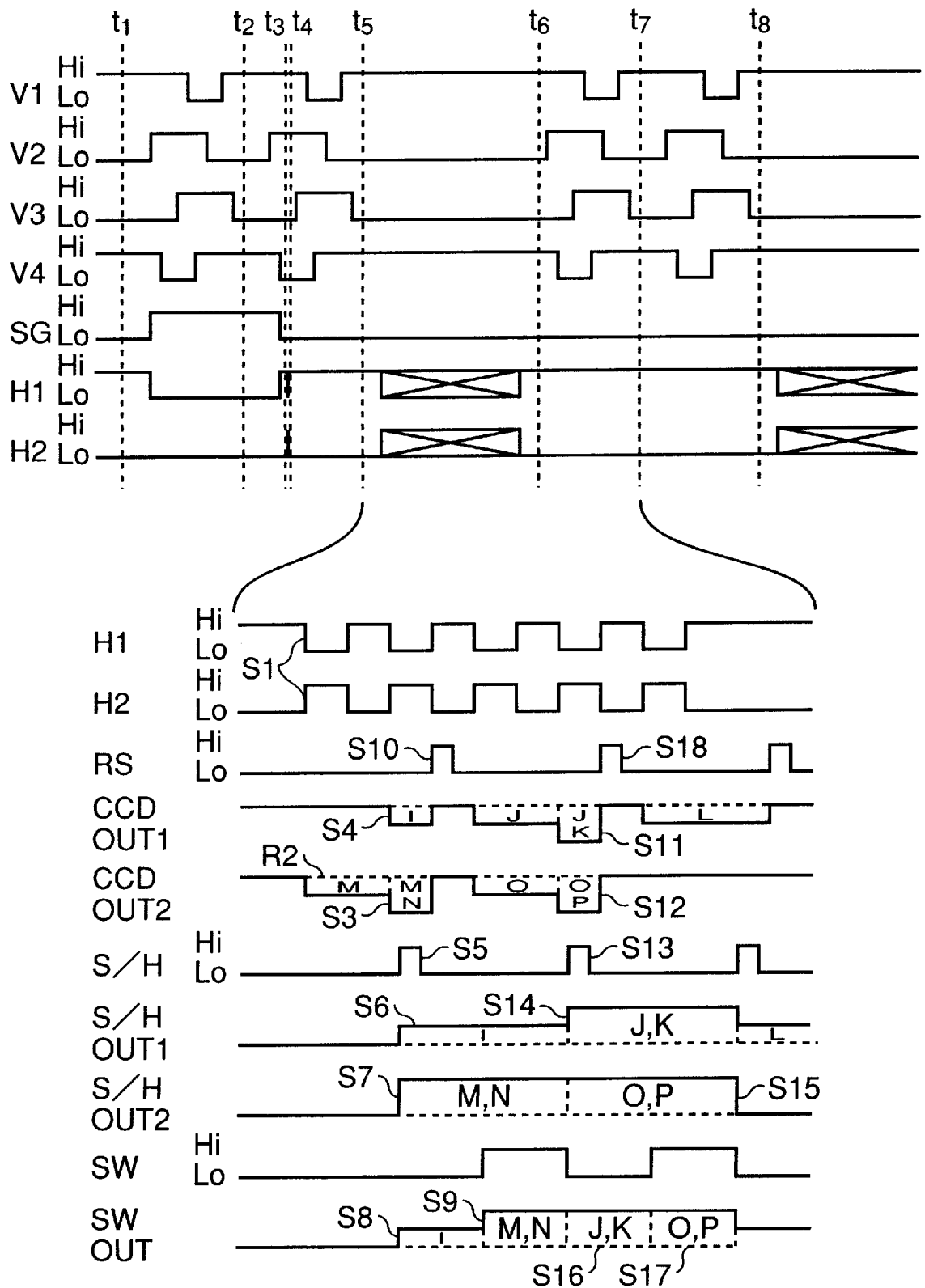
FIG. 5 is a timing chart showing that pixel signals are combined in the CCD and then the combined signal is transmitted to an amplifier.
Figure 6:
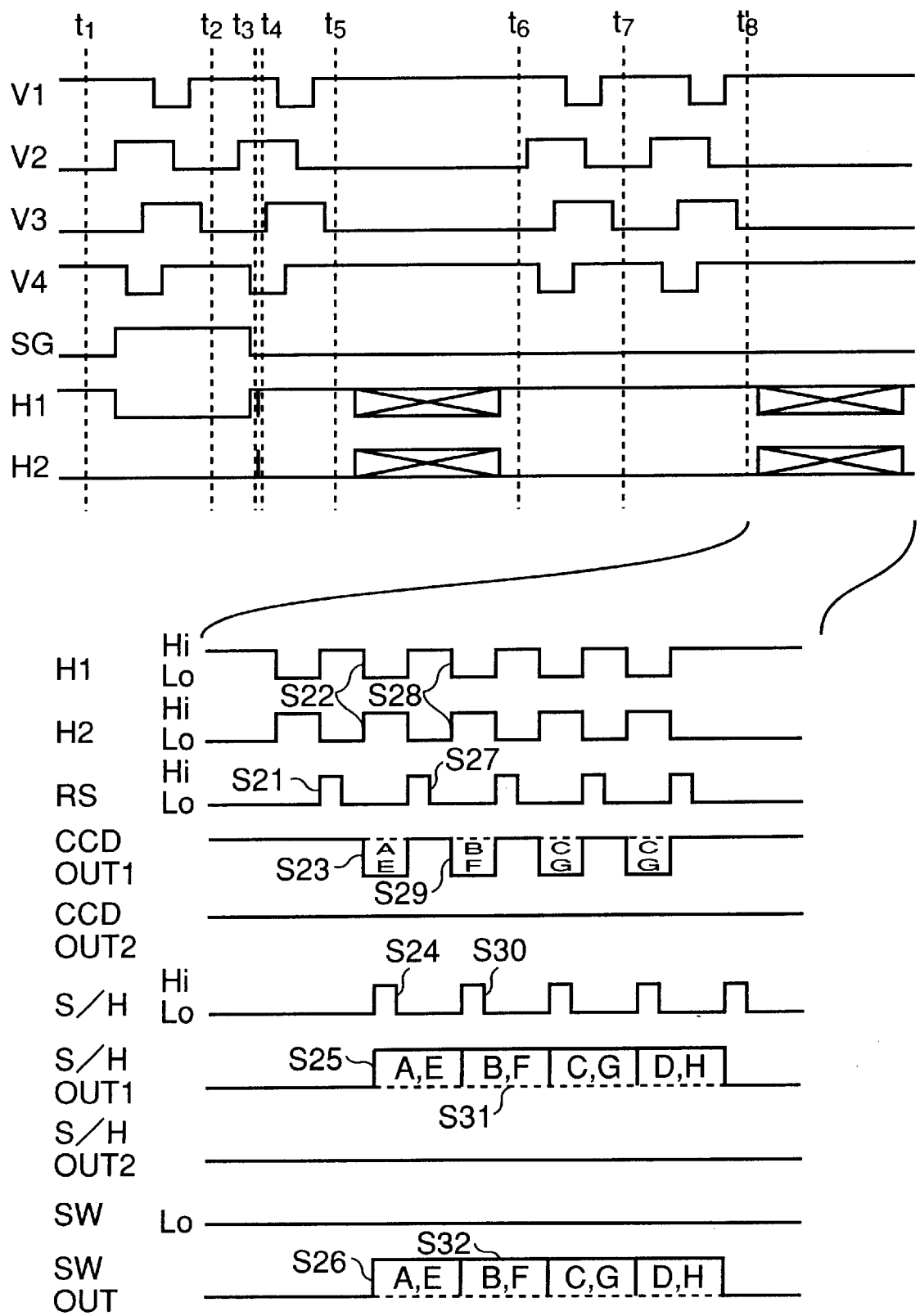
FIG. 6 is a timing chart showing that pixel signals are combined in the CCD and then the combined signal is transmitted to the amplifier.
Figure 7:
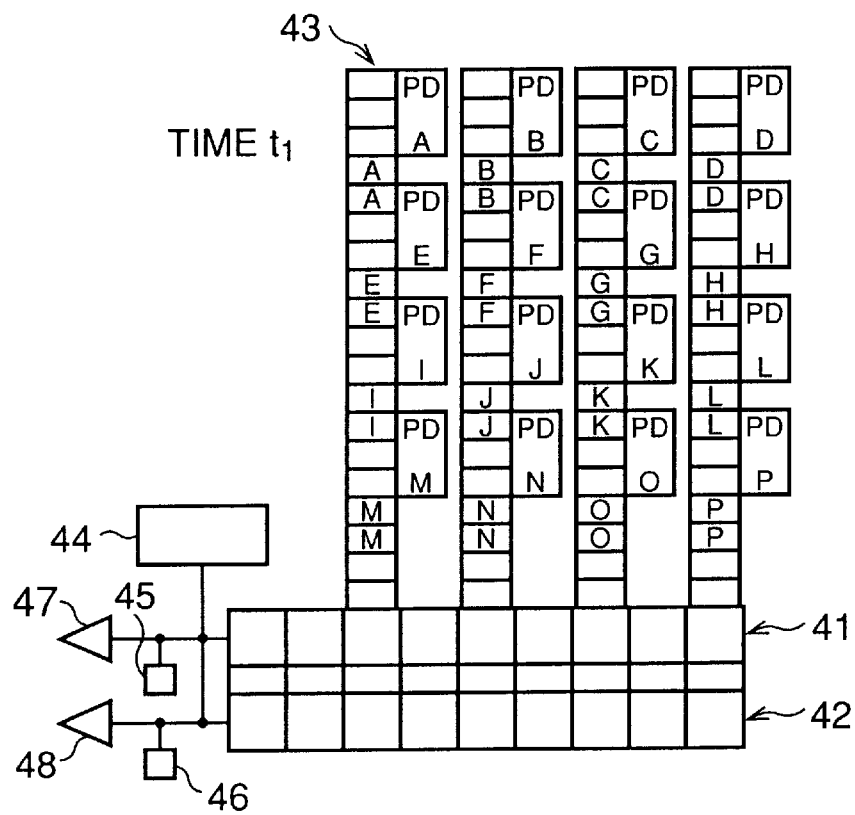
FIG. 7 is a view showing transfer conditions of the pixel signals at time $t_1$.
Figure 8:
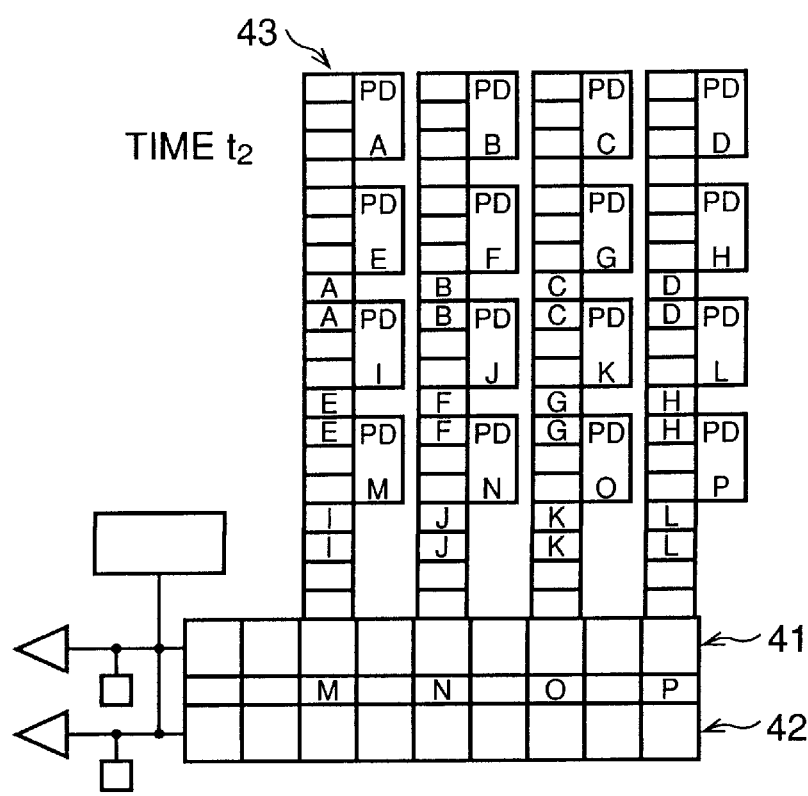
FIG. 8 is a view showing transfer conditions of the pixel signals at time $t_2$.
Figure 9:
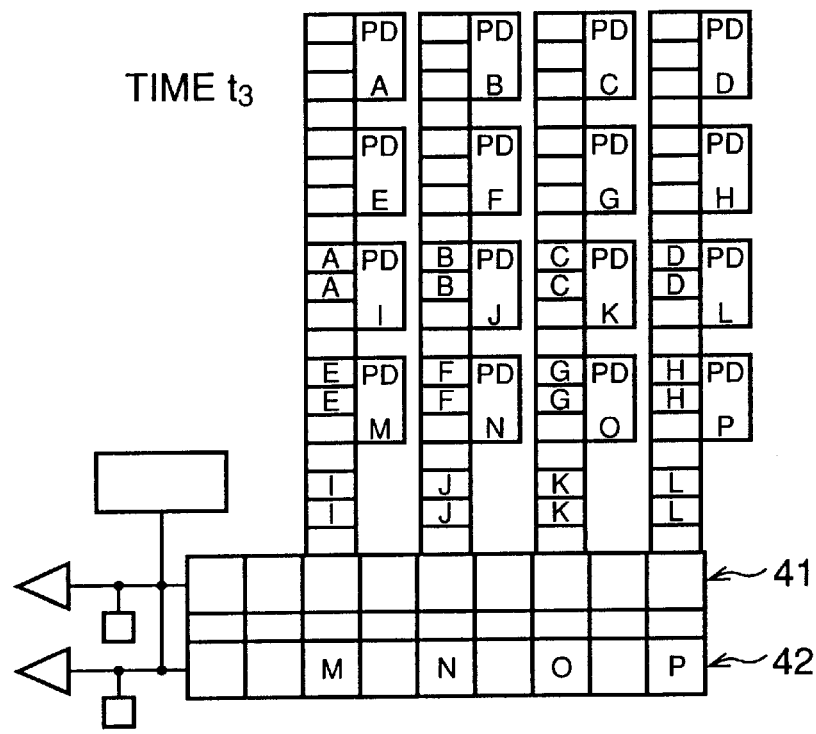
FIG. 9 is a view showing transfer conditions of the pixel signals at time $t_3$.
Figure 10:
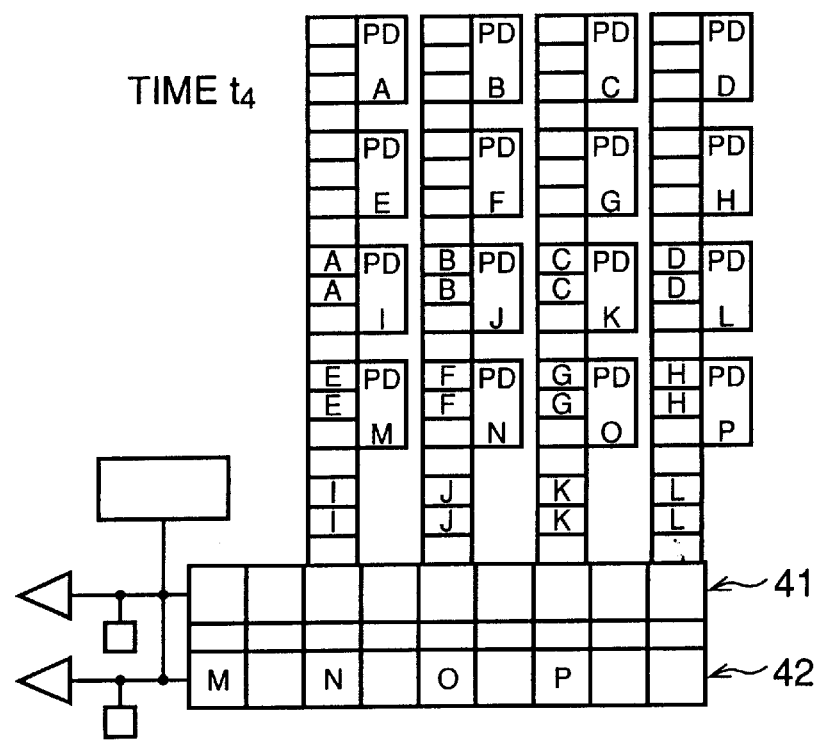
FIG. 10 is a view showing transfer conditions of the pixel signals at time $t_4$.
Figure 11:
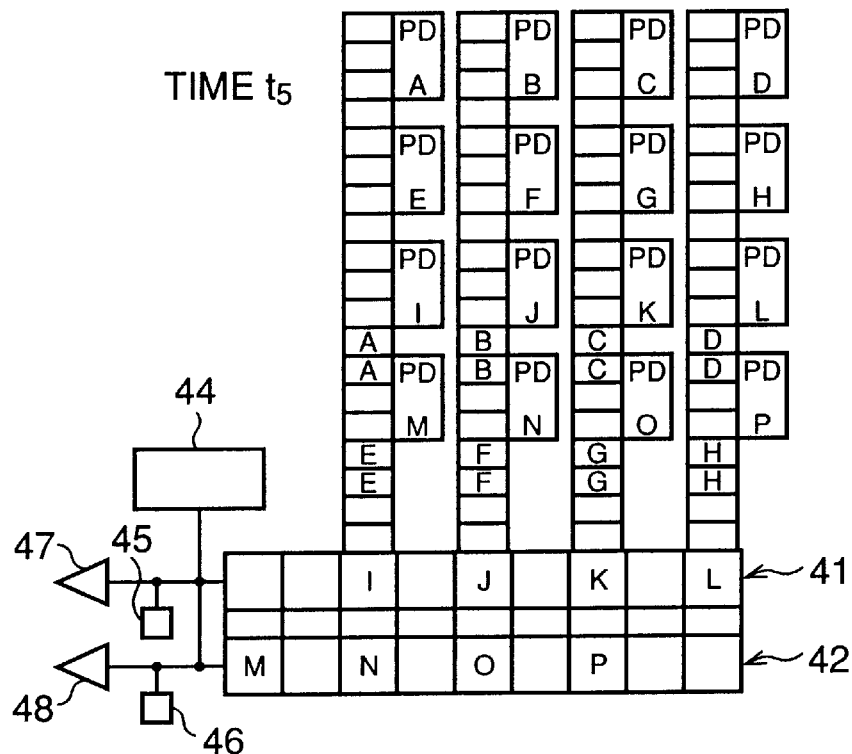
FIG. 11 is a view showing transfer conditions of the pixel signals at time $t_5$.
Figure 12:
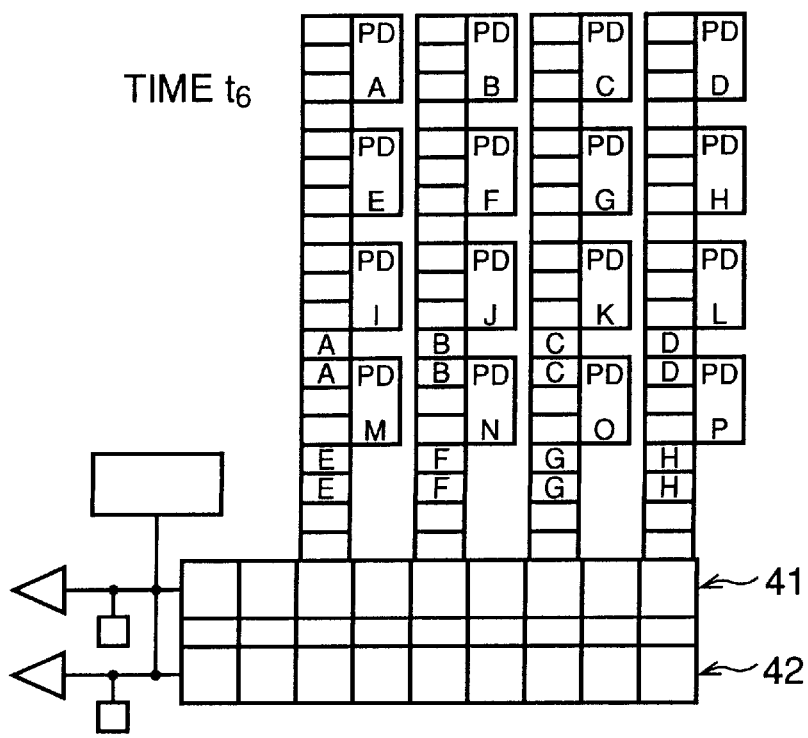
FIG. 12 is a view showing transfer conditions of the pixel signals at time $t_6$.
Figure 13:
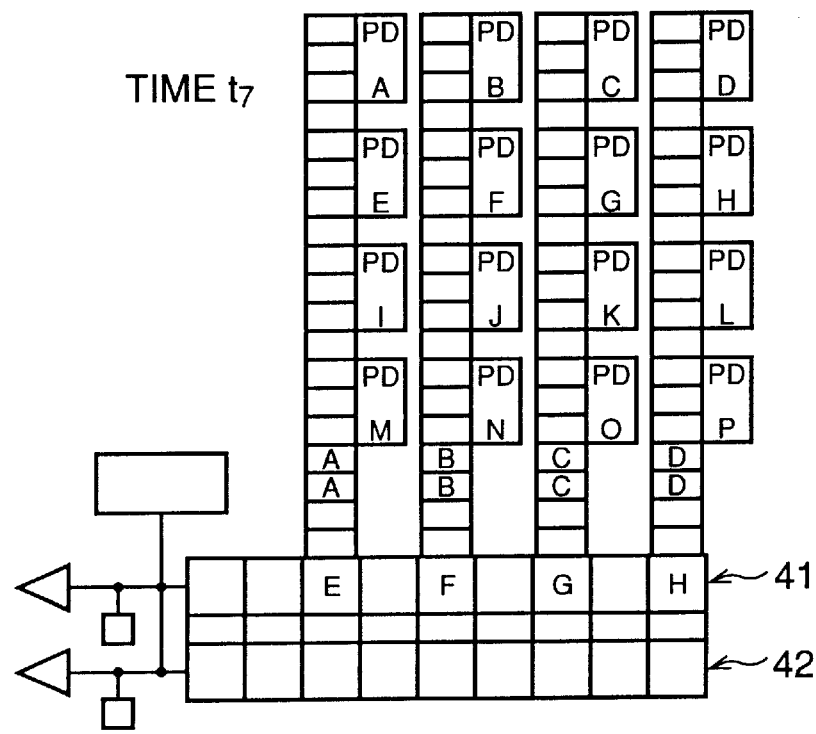
FIG. 13 is a view showing transfer conditions of the pixel signals at time $t_7$.
Figure 14:
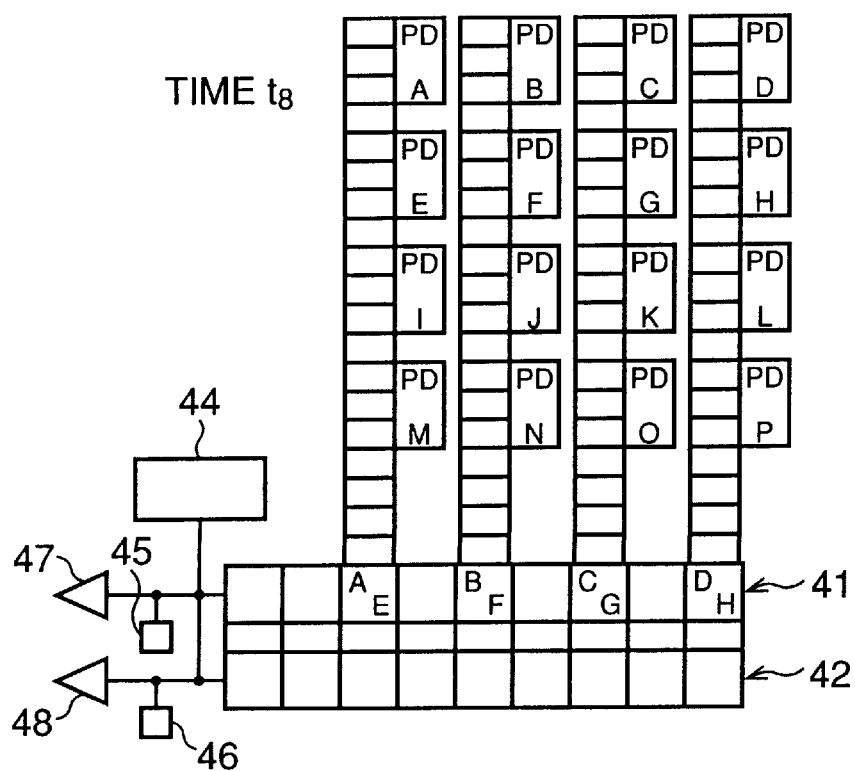
FIG. 14 is a view showing transfer conditions of the pixel signals at time $t_8$.

FIGS. 5 and 6 are timing charts showing that pixel signals are combined in the CCD 12 and then the combined signal is transmitted to the amplifier 16d in the signal processing circuit 16. FIG. 5 shows an operation between times $t_5$ and $t_7$ in specific detail, and FIG. 6 shows an operation after time $t_8$ in specific detail. FIGS. 7 through 14 show transfer conditions of the pixel signals at time $t_1$ through $t_8$, respectively.

In the vertical transfer CCD 43 and the horizontal transfer CCDs 41 and 42, when a voltage signal applied to each of the electrodes VI through V4, H1, and H2 is High (Hi), a potential well is formed at a portion corresponding to the electrode, and when the voltage signal is Low (Lo), a potential well is not formed. In the shift gate electrode SG, when the voltage signal applied thereto is "Hi", a potential well is formed at a portion corresponding to the electrode SG.

It is supposed that, before time $t_1$, the pixel signals A through P generated on the photodiodes have been transferred to the vertical transfer CCD 43, and a vertical transfer has been started. At time $t_1$, the voltages of electrodes V4 and V1 are "Hi" and the voltages of the electrodes V2 and V3 are "Lo", so that the pixel signals A through P are positioned at portions corresponding to the electrodes V4 and V1. At times $t_1$ through $t_2$, the voltages of the electrodes V1 through V4 are changed between "Hi" and "Lo" at a predetermined timing, so that the pixel signals A through P are transferred along the vertical transfer CCD 43. As a result, at time $t_2$, the pixel signals A through P are transferred by one photodiode in comparison with the state at time $t_1$. At this time, since the voltages of the shift gate electrodes SG are "Hi", the pixel signals M, N, O and P are kept in the shift gate electrodes SG.

At time $t_3$, since the voltages of the electrodes V1 and V2 have become "Hi", the pixel signals A through L are transferred to portions corresponding to the electrodes V1 and V2, respectively. In the second horizontal transfer CCD 42, since the voltage of the electrode H1 becomes "Hi" and the voltage of the shift gate electrode SG becomes "Lo", the pixel signals M, N, O and P are transferred from the shift gate electrodes SG to the second horizontal transfer CCD 42.

At times $t_3$ through $t_4$, since the voltage of the electrode H1 becomes "Lo" forming a pulse, and the voltage of the electrode H2 becomes "Hi", forming a pulse, the pixel signals M through P are transferred along the second horizontal transfer CCD 42 to portions corresponding to the next electrodes H1, respectively. At time $t_4$, the pixel signal M is positioned at a portion corresponding to the electrode H1 which is closest to the output terminal of the second horizontal transfer CCD 42. At times $t_4$ through $t_5$, since the voltages of the electrodes V1 through V4 are changed to either "Hi" or "Lo" with a predetermined timing similar to times $t_1$ through $t_5$, the pixel signals A through L are transferred along the vertical transfer CCD 43. Since the voltage of the shift gate electrode SG is "Lo" from times $t_4$ through $t_5$, the pixel signals I, J, K and L are supplied to the first horizontal transfer CCD 41 and kept therein. During this time, a horizontal transfer is not carried out in the second horizontal transfer CCD 42.

After time $t_5$, the voltage of the electrode H1 is changed from "Hi" to "Lo", and the voltage of the electrode H2 is changed from "Lo" to "Hi" (reference S1 in FIG. 5), so that the pixel signal M is outputted from the second horizontal transfer CCD 42, and is inputted into the CDS circuit 16b through the output buffer 48 (reference S2). By repeating the operations of the electrodes H1 and H2, the pixel signal N is outputted from the second horizontal transfer CCD 42 and is transferred to the electric-charge/electric-voltage conversion capacitance 46, in which the pixel signals M and N are combined so that the combined pixel signal MN is generated.

Note that in this specification, combined pixel signals are indicated by placing the references of the individual pixel signals, which form the combined signal, next to each other. For example, the combined pixel signal MN is obtained by combining the pixel signals M and N.

The combined pixel signal MN is supplied to the CDS circuit 16b through the output buffer 48 (reference S3). At the same time, the pixel signal I is outputted from the first horizontal transfer CCD 41, and is supplied to the CDS circuit 16a through the output buffer 47 (reference S4). This pixel signal I, however, is not used for an indicating operation of the LCD 26.

In the CDS circuits 16a and 16b, the pixel signal is sample-held in accordance with the sample-hold signal S/H (reference S5) outputted from the CCD timing signal generating circuit 31. Namely, the pixel signal I is outputted by the CDS circuit 16a (reference S6), and the combined pixel signal MN is outputted from the CDS circuit 16b (reference S7). The switch 16c is switched (or turned) in accordance with a command signal SW outputted by the system control circuit 17. When the command signal SW is "Lo", the pixel signal I outputted from the CDS circuit 16a is inputted into the amplifier 16d (reference S8), and when the command signal SW is "Hi", the combined pixel signal MN outputted from the CDS circuit 16b is inputted into the amplifier 16d (reference S9).

After the pixel signals I and MN are sample-held, the reset signal RS (reference S10) is outputted from the CCD driver 15, and thus, the electric charges accumulated in the electric-charge/electric-voltage conversion capacitances 45 and 46 are reset.

Similar to the operations described above, the pixel signals J and K outputted from the first horizontal transfer CCD 41 are combined with each other in the electric-charge/electric-voltage conversion capacitor 45, and the combined pixel signal JK is supplied to the CDS circuit 16a through the output buffer 47 (reference S11). The pixel signals O and P outputted from the second horizontal transfer CCD 42 are combined with each other in the electric-charge/electric-voltage conversion capacitor 46, and the combined pixel signal OP is supplied to the CDS circuit 16b through the output buffer 48 (reference S12).

In the CDS circuits 16a and 16b, the pixel signals are sample-held in accordance with the sample-hold signal S/H (reference S13), and are inputted into the amplifier 16d in accordance with the switching operation of the switch 16c (references S16 and S17). After the pixel signals JK and OP are sample-held, the reset signal is outputted (reference S18), so that the accumulated electric charges in the electric-charge/electric-voltage conversion capacitances 45 and 46 are reset.

Thus, the pixel signals kept in the first and second horizontal transfer CCDs 41 and 42, i.e., the pixel signals of the (n)th horizontal row A2 are outputted from the CCD 12, and at time $t_6$, there is no pixel signals in the horizontal transfer CCDs 41 and 42.

At times $t_6$ through $t_7$, since the voltages of electrodes V1 through V4 are changed to either "Hi" or "Lo" with a predetermined timing similar to times $t_1$ through $t_2$, the pixel signals A through H are transferred along the vertical transfer CCD 43, so that the pixel signals E, F, G and H are transferred to the first horizontal transfer CCD 41. In the horizontal transfer CCD 41, the voltage of the electrode H1 is "Hi", the voltage of the electrode H2 is "Lo", and the voltage of the shift gate electrode SG is "Lo". Therefore, the pixel signals E through H are kept in portions corresponding to the electrodes H1.

At times $t_7$ through $t_8$, a vertical transfer is carried out again, and in this period, a voltage of each of the electrodes of the horizontal transfer CCD 41 is not changed. Therefore, at time $t_8$, the pixel signals A, B, C and D are supplied to the horizontal transfer CCD 41, and are added to the pixel signals E, F, G and H, respectively, so that the combined pixel signals AE, BF, CG, and DH are obtained.

After time $t_8$, the electric charge accumulated in the electric-charge/electric-voltage conversion capacitances 45 and 46 are reset by the reset signal RS (reference S21). Then, the voltage of the electrode HI is changed from "Hi" to "Lo", and the voltage of the electrode H2 is changed from "Lo" to "Hi" (reference S22), so that the combined pixel signal AE is outputted from the first horizontal transfer CCD 41, and is inputted into the CDS circuit 16a through the output buffer 47 (reference S23). Note that during this time, no signal is outputted from the second horizontal transfer CCD 42.

In the CDS circuit 16a of the signal processing circuit 16, the combined pixel signal AE is sample-held (reference S25) in accordance with the sample-hold signal S/H (reference S24). Since the switch 16c is set to the side of the CDS circuit 16a, the sample-held pixel signal AE is inputted into the amplifier 16d as it is (reference S26).

After the pixel signal AE is sample-held, the electric charge accumulated in the electric-charge/electric-voltage conversion capacitors 45 and 46 are reset by the reset signal RS (reference S27). Then, the combined pixel signal BF is outputted from the first horizontal transfer CCD 41 in accordance with the voltage change of the electrodes H1 and H2 (reference S28), and is inputted into the CDS circuit 16a through the output buffer 47 (reference S29). In the CDS circuit 16a, the pixel signal BF is sample-held (reference S31) in accordance with the sample-hold signal S/H (reference S30), and is inputted into the amplifier 16d (reference S32).

As described above, in the pixel signals generated in the CCD 12, pairs of pixel signals, which are contained in the first and second horizontal lines B1 and B2 and are positioned adjacent to each other in a vertical direction, are combined with each other, and pairs of pixel signals, which are contained in the third and fourth horizontal lines B3 and B4, respectively, and which are positioned adjacent to each other in a horizontal direction, are combined with each other. Then, the combined pixel signals are outputted from the signal processing circuit 16. Namely, in this embodiment, since the pixel signals generated in the CCD 12 are combined with each other in the CCD 12, the image indicating device does not need to have a specific calculation circuit for performing an adding calculation.

Further, in this embodiment, since a complementary color filter composed of Mg, G, Ye, and Cy color filter elements is not provided, the image indicating device does not need to have a circuit for performing the complementary-color to primary-color rectification. Therefore, according to this embodiment, the circuit construction is simple, so that the size of the circuit in the electronic camera is kept small, and that the manufacturing cost can be restrained.

Figure 15:
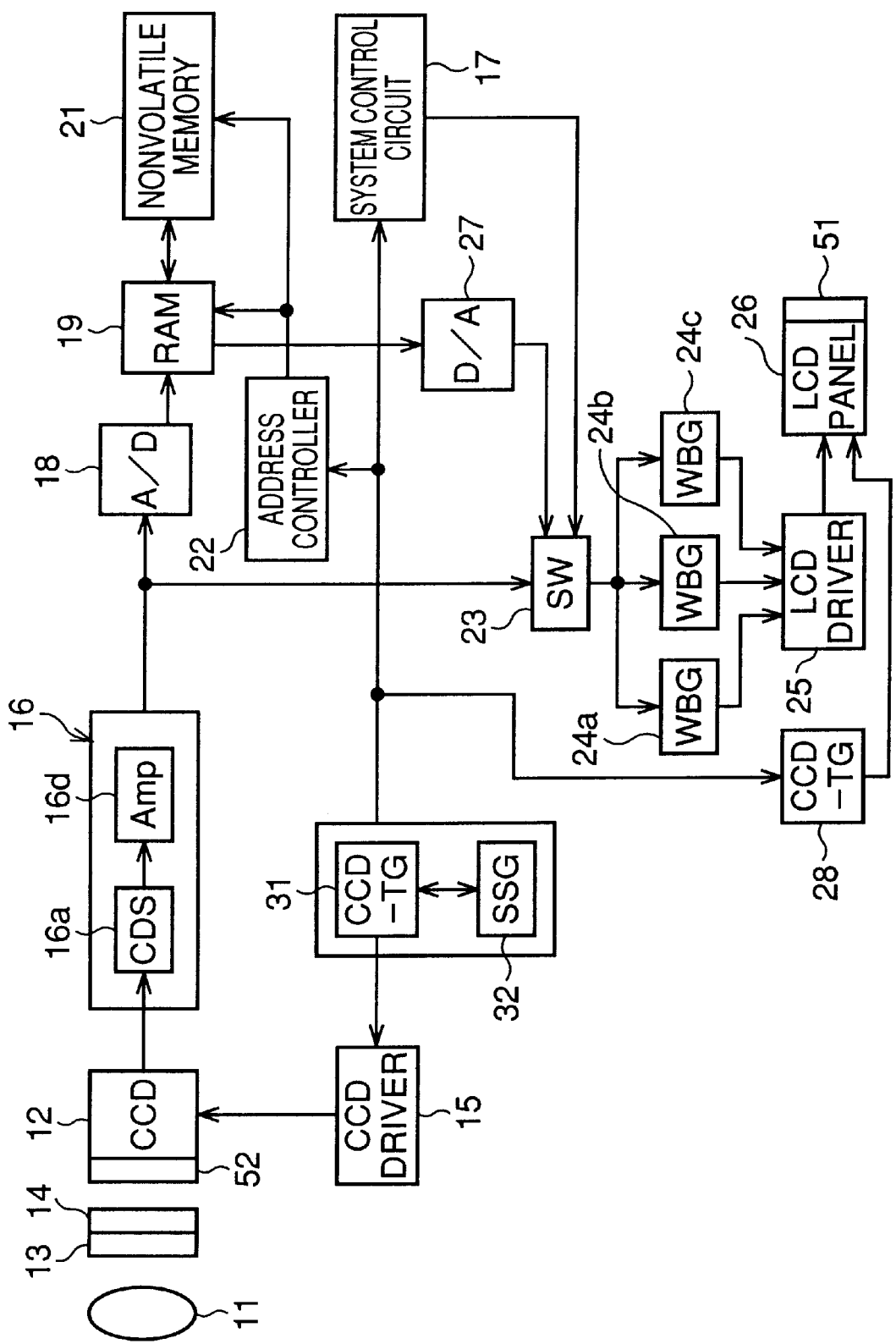
FIG. 15 is a block diagram showing a circuit of an electronic camera having an image indicating device of a second embodiment of the present invention.

FIG. 15 is a block diagram showing a circuit of an electronic camera having an image indicating device of a second embodiment of the present invention.

The basic difference between the first embodiment and the second embodiment is that the CCD 12 is of a one-line read type and all pixels are independently read. Namely, each of the pixel signals generated in the photodiodes is transferred to the horizontal transfer CCD without being combined with each other in the vertical transfer CCD, and the pixel signal is outputted from the CCD 12 one horizontal line by one horizontal line. Therefore, the signal processing circuit 16 has a single CDS circuit 16a, and is not provided with a switch 16c which is provided in the first embodiment. Since the other constructions are the same as those of the first embodiment, the same references are applied to the corresponding parts, and the explanations thereof are omitted.

Figure 16:
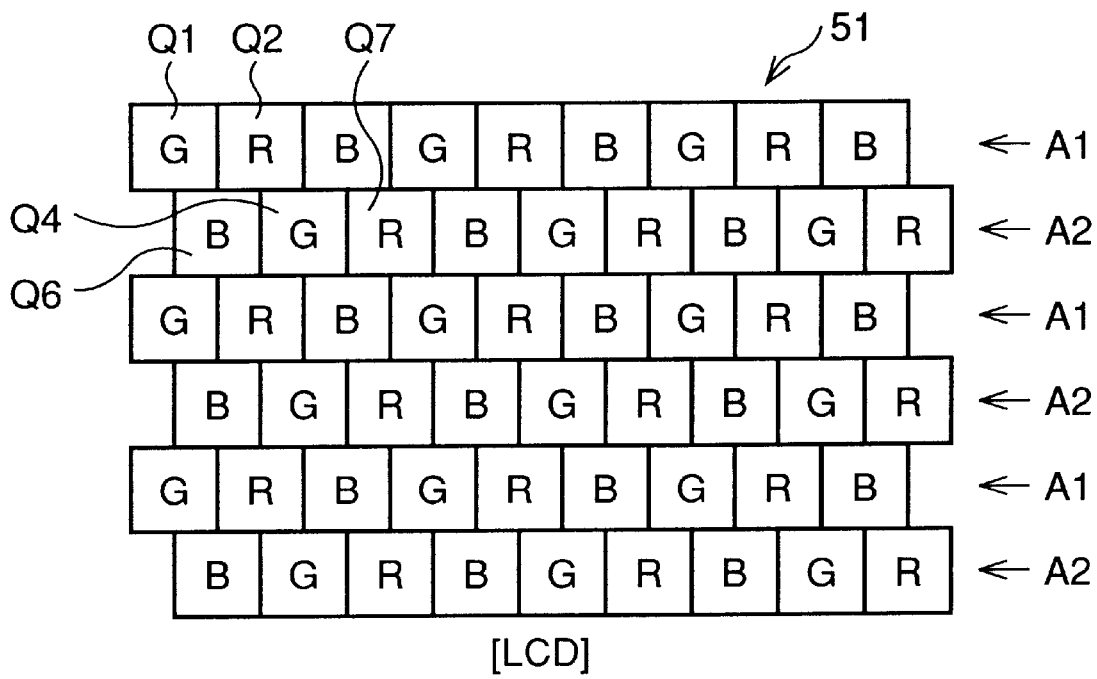
FIG. 16 is a view showing an arrangement of color filter elements of the first color filter provided on the LCD in the second embodiment.
Figure 17:
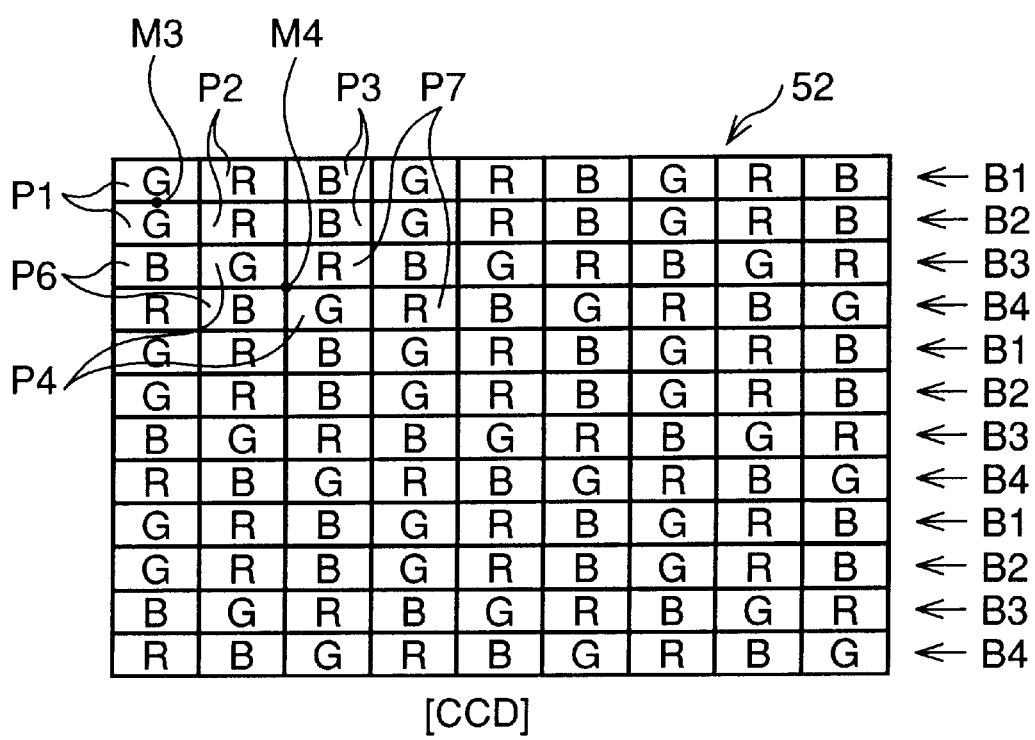
FIG. 17 is a view showing an arrangement of color filter elements of the second color filter provided on the CCD in the second embodiment.

FIG. 16 shows an arrangement of the color filter elements of the first color filter 51 provided on the LCD 26, and FIG. 17 shows an arrangement of the color filter elements of the second color filter 52 provided on the CCD 12.

Similar to the first embodiment, the first color filter 51 is constructed according to the delta-arrangement. Namely, in a first horizontal row A1, the color filter elements are arranged in the order of G, R, B from left to right, and each of the color filter elements of the second horizontal row A2 is offset in horizontal direction by one and a half dots (i.e., 1.5 pitch) relative to that of the first horizontal line A1.

In the CCD 12, the photodiodes are arranged in a matrix. A number of the pixels is approximately twice a number of the dots of the LCD 26. In first and second horizontal lines B1 and B2, the color filter elements are arranged in the order of G, R, B from left to right. In a third horizontal line B3, B elements are at portions directly below G elements of the second horizontal line B2, G elements are provided at portions directly below R elements of the second horizontal line B2, and R elements are provided at portions directly below B elements of the second horizontal line B2. In a fourth horizontal line B4, R elements are provided at portions directly below B elements of the third horizontal line B3, B elements are provided at a portion directly below G elements of the third horizontal line B3, and G elements are provided at portions directly below R elements of the third horizontal line B3.

In the CCD 12, the first horizontal row A1 of the LCD 26 corresponds to the first and second horizontal lines B1 and B2, and the second horizontal row A2 of the LCD 26 corresponds to the third and fourth horizontal lines B3 and B4.

In the second color filter 52, the colors of color filter elements of pairs of adjacent pixels are the same. In the first and second horizontal lines B1 and B2, similarly to the first embodiment, the color filter elements of the pixel pairs shown by references P1, P2 and P3 are G, R and B, respectively. In the third and fourth horizontal lines B3 and B4, the color filter elements of the pixel pairs shown by references P6, P4, and P7 are B, G, and R, respectively.

Dot Q1 on the first horizontal row A1 of the LCD 26 corresponds to the pixels P1 on the first and second horizontal lines B1 and B2 of the CCD 12, and dot Q2 on the first horizontal row A1 corresponds to the pixels P2 on the first and second horizontal lines B1 and B2 of the CCD 12. Two pixels corresponding to each of the dots on the first horizontal row A1 are arranged in a vertical direction.

Dot Q6 on the second horizontal row A2 of the LCD 26 corresponds to the two pixels P6 on the third and fourth horizontal lines B3 and B4 of the CCD 12. Dot Q4 on the second horizontal row A2 corresponds to the two pixels P4 on the third and fourth horizontal lines B3 and B4. Dot Q7 on the second horizontal row A2 corresponds to the two pixels P7 on the third and fourth horizontal lines B3 and B4. Namely, on the CCD 12, the two pixels corresponding to each of the dots on the second horizontal row A2 are arranged in an oblique direction.

As described above, in the second embodiment, the colors of the color filter components provided on the pairs of pixels (the two pixels of reference P1, for example), which are included in the first and second horizontal lines B1 and B2 and are adjacent to each other in a vertical direction, are the same as that of the color filter element which is provided on the corresponding dot (reference Q1, for example) of the LCD 26, which corresponding dot corresponds to the center-point M3 between the two pixels. Further, the colors of the color filter components provided on the pairs of pixels (the two pixels of reference P4, for example), which are included in the third and fourth horizontal lines B3 and B4 and are adjacent to each other in an oblique direction, are the same as that of the color filter element which is provided on the corresponding dot (reference Q4, for example) of the LCD 26, which corresponding dot corresponds to the center-point M4 between the two pixels.

Figure 18:
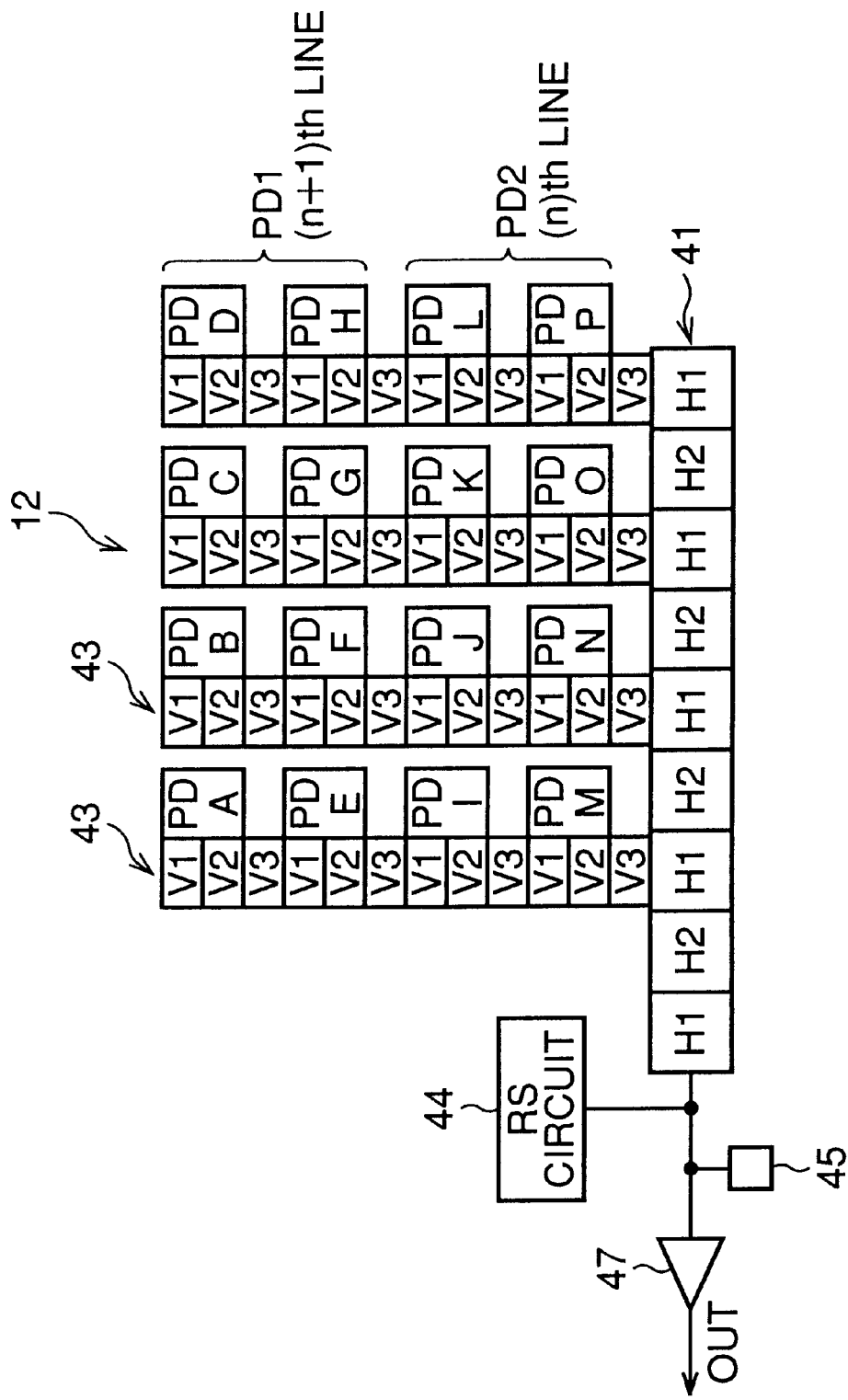
FIG. 18 is a view showing a construction of the CCD of the second embodiment.

FIG. 18 shows a construction of the CCD 12.

The CCD 12 has a single horizontal transfer CCD 41. Three electrodes V1 through V3 are connected to one photodiode PD, so that pixel signals A through P obtained by the photodiodes PD are transferred independently of each other by the vertical transfer CCD 43 and are supplied to the horizontal transfer CCD 41. Based on the pixel signals A, B, C, D, E, F, G, and H generated by the photodiodes PD1 forming two lines extending in horizontal directions, a dot signal of the (n+1)th horizontal row A1 on the LCD 26 is generated. Based on the pixel signals I, J, K, L, M, N, O and P generated by the photodiodes PD2 forming two lines extending in horizontal directions, a dot signal of the (n)th horizontal row A2 on the LCD 26 is generated.

The horizontal transfer CCD 41 has first and second electrodes HI and H2 which are alternately arranged. A reset circuit 44, an electric-charge/electric-voltage conversion capacitor 45, and an output buffer 47 are connected to an output terminal of the horizontal transfer CCD 41. The operations of the reset circuit 44, the electric-charge/electric-voltage conversion capacitor 45 and the output buffer 47 are the same as those of the first embodiment.

Figure 19:
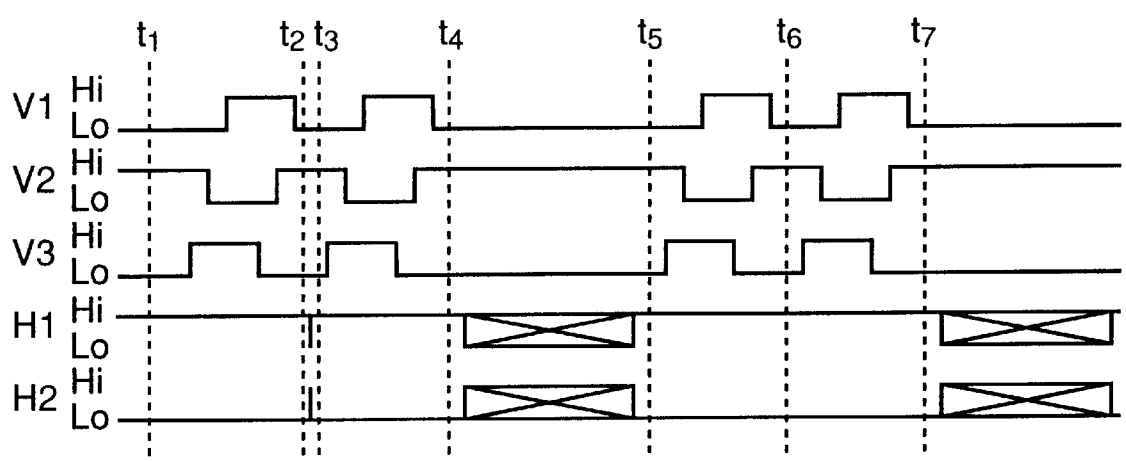
FIG. 19 is a timing chart showing an operation in which pixel signals are combined and outputted from the CCD in the second embodiment.
Figure 20:
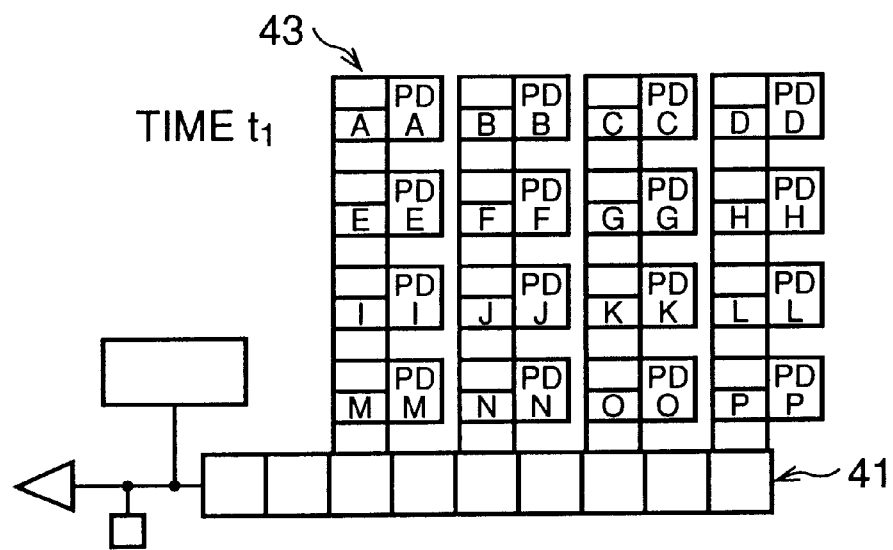
FIG. 20 is a view showing transfer conditions of the pixel signals at time $t_1$.
Figure 21:
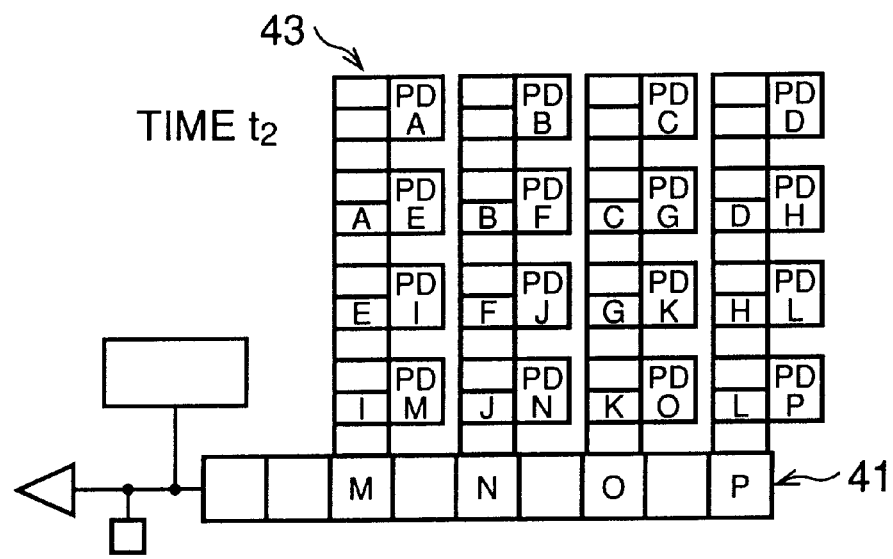
FIG. 21 is a view showing transfer conditions of the pixel signals at time $t_2$.
Figure 22:
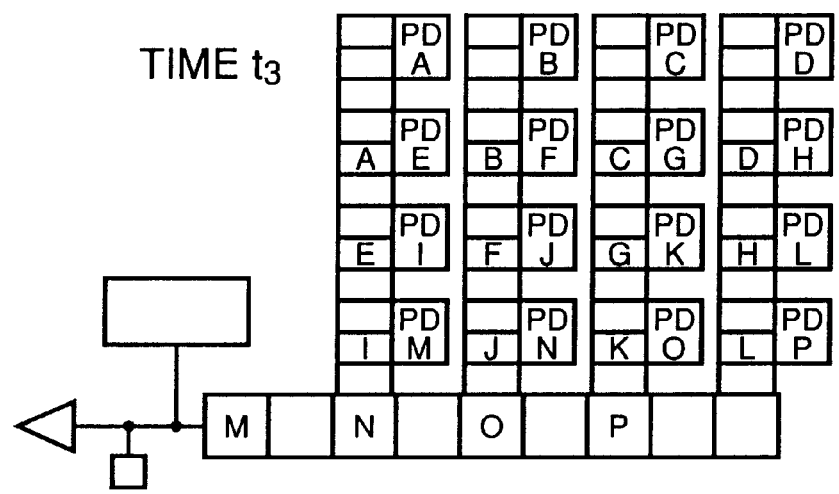
FIG. 22 is a view showing transfer conditions of the pixel signals at time $t_3$.
Figure 23:
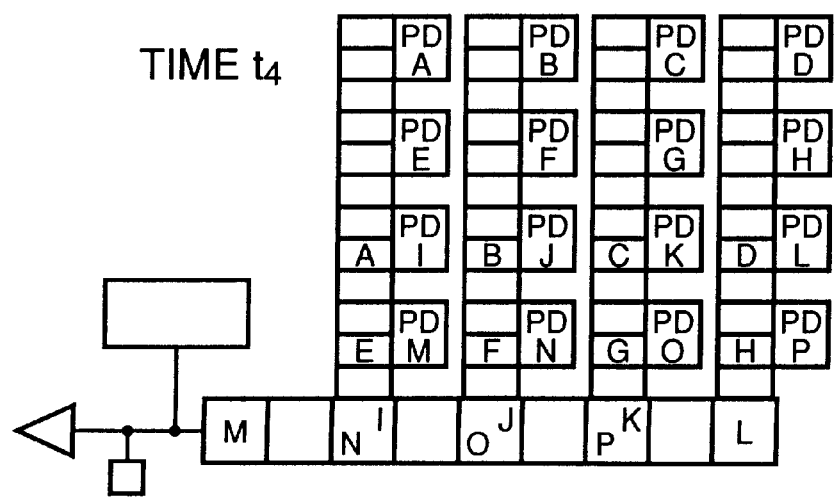
FIG. 23 is a view showing transfer conditions of the pixel signals at time $t_4$.
Figure 24:
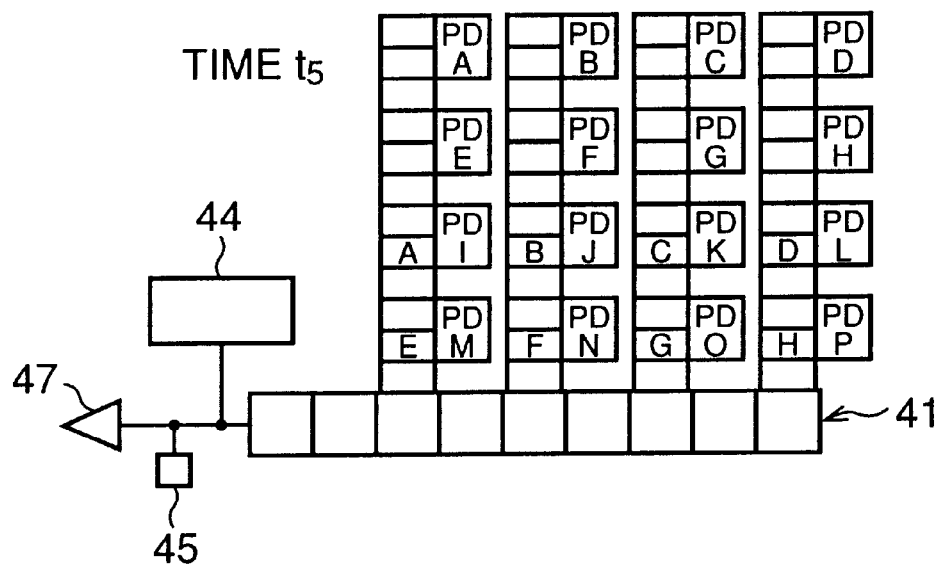
FIG. 24 is a view showing transfer conditions of the pixel signals at time $t_5$.
Figure 25:
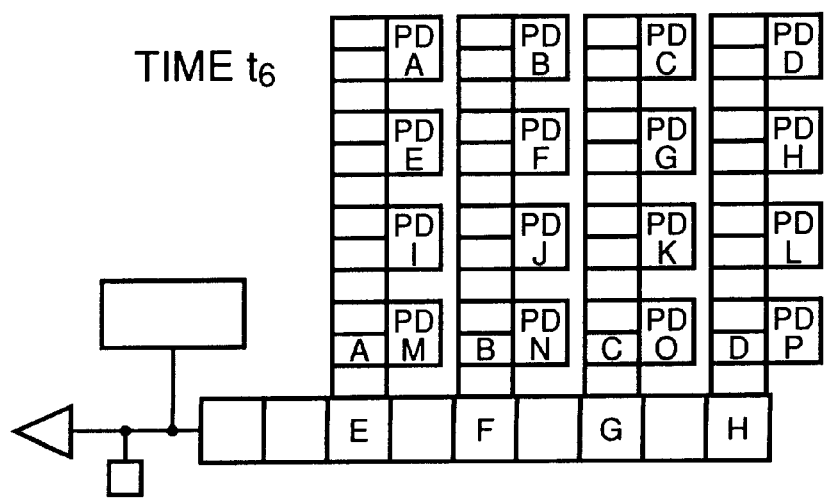
FIG. 25 is a view showing transfer conditions of the pixel signals at time $t_6$.
Figure 26:
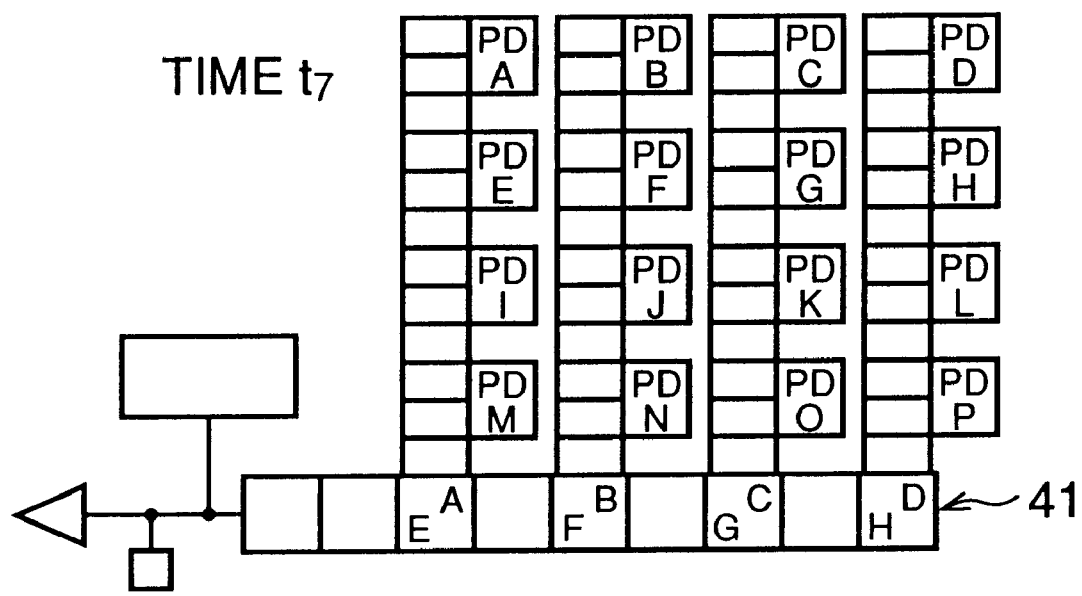
FIG. 26 is a view showing transfer conditions of the pixel signals at time $t_7$.

FIG. 19 is a timing chart showing an operation in which pixel signals are combined and outputted from the CCD 12. FIGS. 20 through 26 show transfer conditions of the pixel signals at times $t_1$ through $t_7$, respectively.

At time $t_1$, the voltage of the electrode V2 is "Hi" and the voltages of the electrodes V1 and V3 are "Lo", so that the pixel signals A through P transferred into the vertical transfer CCD 43 are positioned at portions corresponding to the electrodes V2. At times $t_1$ through $t_2$, the voltages of the electrodes V1 through V3 are changed to either "Hi" or "Lo"

at a predetermined timing, so that the pixel signals A through P are transferred along the vertical transfer CCD 43. At time $t_2$, the pixel signals A through L are transferred by one photodiode in comparison with the state of time $t_1$, and the pixel signals M, N, O, and P are positioned at the horizontal transfer CCD 41.

At times $t_2$ through $t_3$, since the voltage of the electrode H1 becomes "Lo", forming a pulse, and the voltage of the electrode H2 becomes "Hi", forming a pulse, the pixel signals M through P are transferred along the second horizontal transfer CCD 41 to portions corresponding to the next electrodes H1. At time $t_3$, the pixel signal M is positioned at a portion corresponding to the electrode H1 which is closest to the output terminal of the second horizontal transfer CCD 41.

At times $t_3$ through $t_4$, since the voltages of the electrodes V1 through V3 are changed to either "Hi" or "Lo" with a predetermined timing similar to times $t_1$ through $t_2$, the pixel signals A through L are transferred along the vertical transfer CCD 43, so that the pixel signals I, J, K, and L are supplied to the horizontal transfer CCD 41. During this time, the voltages of the electrodes H1 and H2 of the horizontal transfer CCD 41 are fixed (i.e., the electrode H1 is "Hi" and the electrode H2 is "Lo"), the pixel signals M through P in the horizontal transfer CCD 41 are stopped, and at time $t_4$, the pixel signals I, J, and K are added to the pixel signals N, O, and P, so that the combined pixel signals IN, JO, and KP are obtained.

At times $t_4$ through $t_5$, since the voltage of the electrode H1 is changed to either "Hi" or "Lo" with a predetermined timing, so that the pixel signals M, IN, JO, KP, and L are transferred along the horizontal transfer CCD 41. First, the pixel signal M is outputted from the horizontal transfer CCD 41, is transferred to the electric-charge/electric-voltage conversion capacitor 45, and then is supplied to the CDS circuit 16a through the output buffer 47. After the electric charges accumulated in the electric-charge/electric-voltage conversion capacitor 45 is reset by the reset circuit 44, the combined pixel signal IN is outputted from the horizontal transfer CCD 41, is transferred to the electric-charge/electric-voltage conversion capacitor 45, and then is supplied to the CDS circuit 16a through the output buffer 47. In the same way, the pixel signals JO, KP, and L are outputted from the horizontal transfer CCD 41. By time $t_5$, the operation in which the pixel signals of one horizontal line are outputted from the horizontal transfer CCD 41 has been completed.

At times $t_5$ through $t_6$, since the voltages of the electrodes V1 through V3 are changed to either "Hi" or "Lo" with a predetermined timing similar to times $t_1$ through $t_2$, the pixel signals A through H are transferred along the vertical transfer CCD 43. At time $t_6$, the pixel signals E, F, G, and H are supplied to the horizontal transfer CCD 41. Also at times $t_6$ through $t_7$, the vertical transfer is carried out, and during this time, the voltages of the electrodes H1 and H2 of the horizontal transfer CCD 41 are fixed (i.e., the electrode H1 is "Hi" and the electrode H2 is "Lo"), the pixel signals E through H in the horizontal transfer CCD 41 are stopped. Therefore, at time $t_7$, the pixel signals A, B, C, and D are added to the pixel signals E, F, G, and H.

Then, the horizontal transfer is carried out, so that the pixel signals AE, BF, CG, and DH are outputted from the CCD 12.

As described above, in this embodiment, since the image indicating device does not need to have a specific calculation circuit for adding pixel signals, the circuit construction is simple, so that the size of the circuit in the electronic camera is kept small, which is similar to the first embodiment.

FIGS. 27 through 30 show a third embodiment of the present invention. The circuit construction of the electronic camera of the third embodiment is the same as that of the second embodiment which is shown in FIG. 15.

Figure 27:
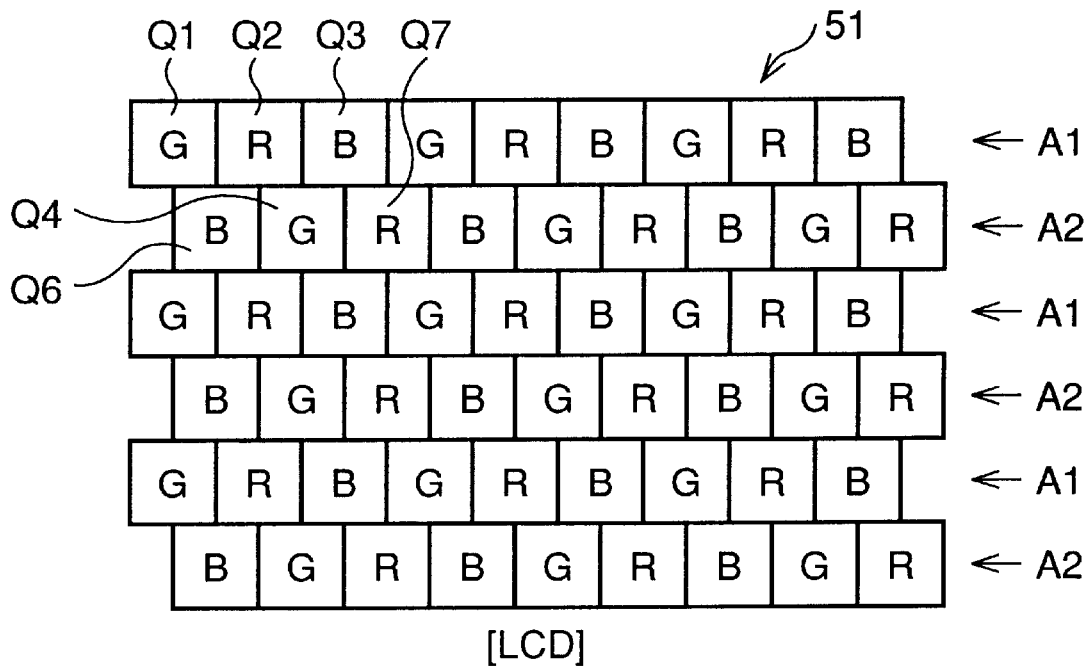
FIG. 27 is a view showing an arrangement of the color filter elements of the first filter provided on the LCD in a third embodiment.
Figure 28:
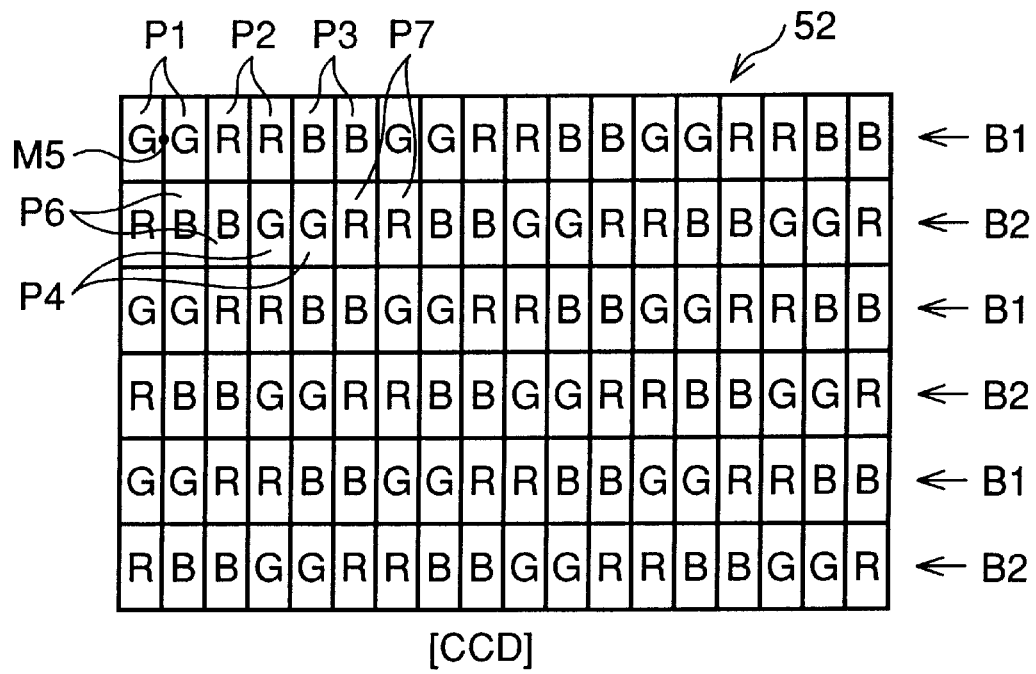
FIG. 28 is a view showing an arrangement of the color filter elements of the second color filter provided on the CCD in the third embodiment.

FIG. 27 shows an arrangement of the color filter elements of the first color filter 51 provided on the LCD 26, and FIG. 28 shows an arrangement of the color filter elements of the second color filter 52 provided on the CCD 12.

Similar to those of the first and second embodiments, the first color filter 51 is constructed according to the delta-arrangement.

In the CCD 12, the photodiodes are arranged in a matrix. The number of pixels i.e., photodiodes, is approximately double the number of dots of the LCD 26. In a first horizontal line B1, the color filter elements are arranged in the order of G, G, R, R, B, B from left to right. In a second horizontal line B2, the color filter elements of R, B, B, G, G, and R are provided at portions directly below G, G, R, R, B, and B of the first horizontal line B1. Namely, two color filter elements having the same color (e.g., R shown by reference P2) in the first horizontal line B1 are offset by one pixel in a horizontal direction relative to two color elements having the same color (e.g., G shown by reference P6) in the second horizontal line B2.

The first horizontal row A1 of the LCD 26 corresponds to the first horizontal line B1 in the CCD 12, and the second horizontal row A2 of the LCD 26 corresponds to the second horizontal line B2.

In the second color filter 52, the colors of color filter elements are the same for pairs of adjacent pixels. In the first horizontal line B1, the color filter elements of the pairs of pixels shown by references P1, P2 and P3 are G, R and B, respectively. In the second horizontal lines B2, the color filter elements of the pairs of pixels shown by reference P6, P4 and P7 are B, G and R, respectively.

Dots Q1, Q2, and Q3 on the first horizontal row A1 of the LCD 26 correspond to the pixels P1, P2, and P3 on first horizontal line B1 of the CCD 12. Dots Q6, Q4, and Q7 on the second horizontal row A2 correspond to pixels P6, P4, and P7 on the second horizontal line B2.

As described above, in the third embodiment, the colors of the color filter components provided on the pairs of pixels (two pixels of reference P1, for example), which are included in the first horizontal line B1 and are adjacent to each other in a horizontal direction, are the same as that of the color filter element which is provided on the corresponding dot (reference Q1, for example) of the LCD 26, which corresponding dot corresponds to the center-point M5 between the two pixels.

Figure 29:
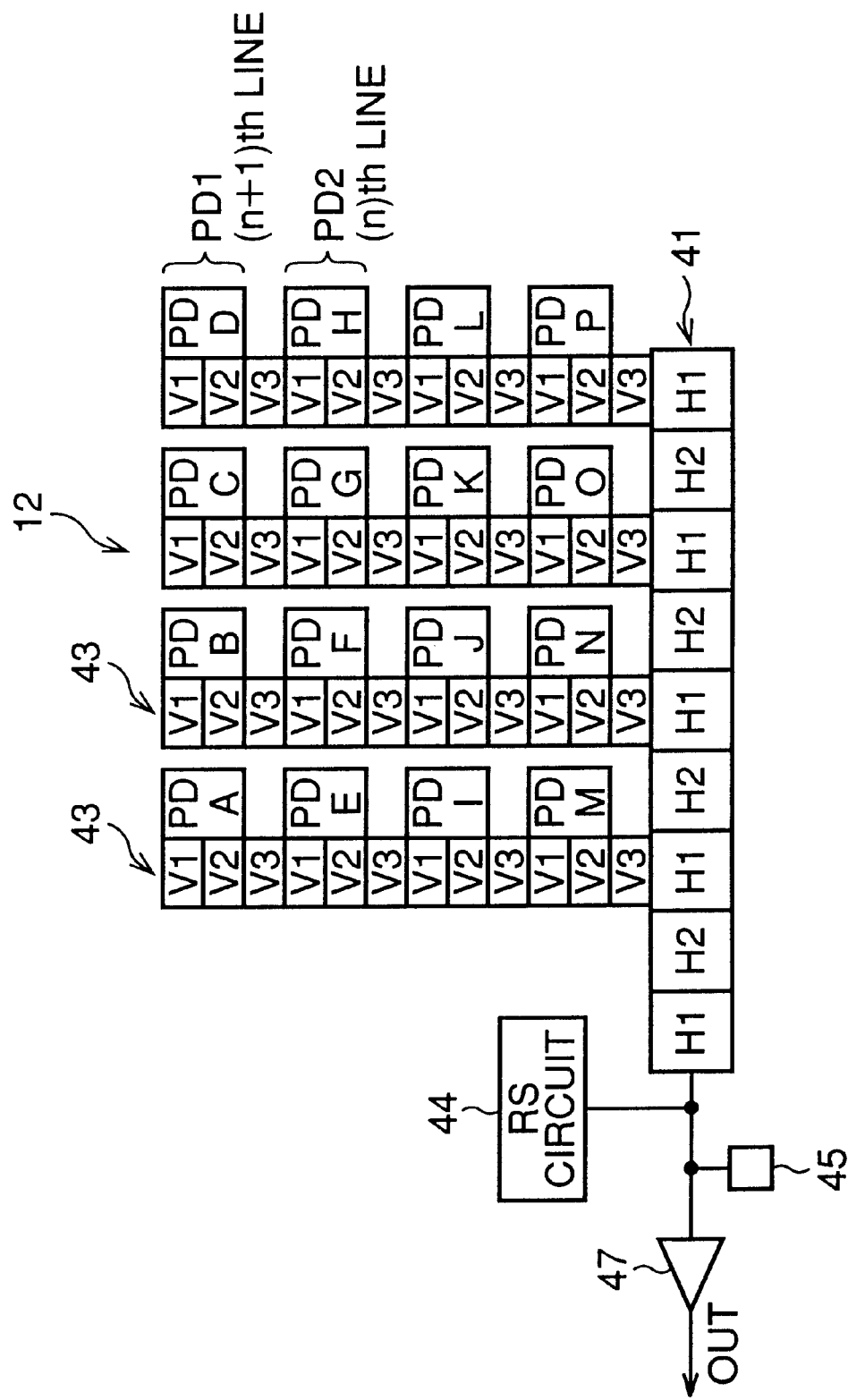
FIG. 29 is a view showing a construction of the CCD of the third embodiment.

FIG. 29 shows a construction of the CCD 12.

The CCD 12 has basically the same construction as that of the second embodiment. The CCD 12 has a different construction from the second embodiment, in that the construction of the dot signal of the (n+1)th horizontal row A1 on the LCD 26 is generated based on the pixel signals A, B, C, and D generated in the photodiodes PD1 which are aligned along a line extending in a horizontal direction, and the dot signal of the (n)th horizontal row A2 on the LCD 26 is generated based on the pixel signals E, F, G, and H generated in the photodiodes PD2 which are aligned along a line extending in a horizontal direction.

Figure 30:
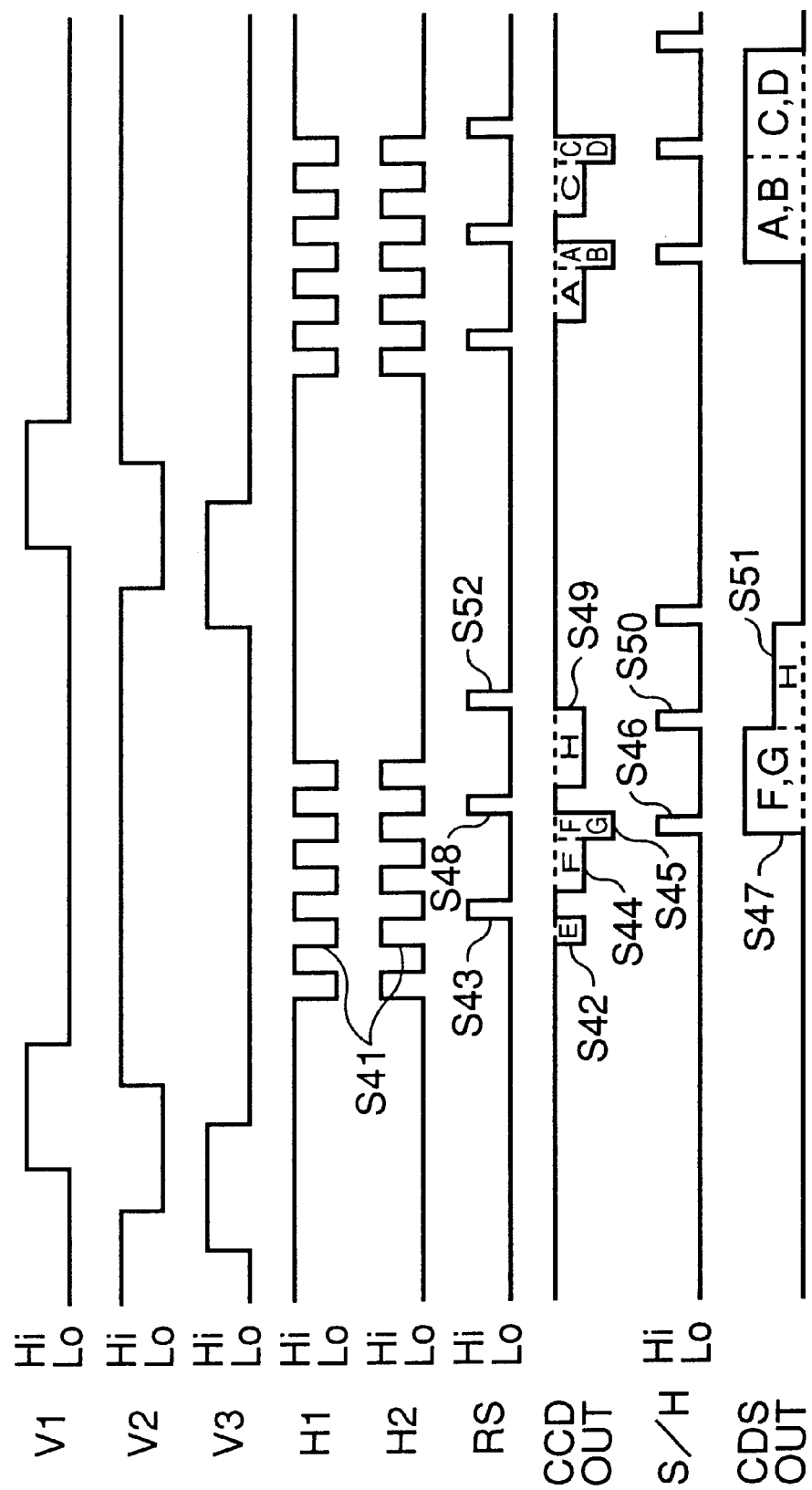
FIG. 30 is a timing chart showing an operation in which pixel signals are combined and outputted from the CCD in the third embodiment.

FIG. 30 is a timing chart showing an operation in which pixel signals are combined and outputted from the CCD 12.

The voltages of the electrodes V1 through V3 are changed to either "Hi" or "Lo" at a predetermined timing, so that the pixel signals A through P are transferred along the vertical transfer CCD 43, and the pixel signals E, F, G, and H are supplied to the horizontal transfer CCD 41. Then, the pixel signals E, F, G, and H are transferred along the horizontal transfer CCD 41, so that the pixel signal E reaches a portion corresponding to the electrode H1 which is closest to the output terminal of the horizontal transfer CCD 41.

In this state, the voltage of the electrode H1 is changed from "Hi" to "Lo", and the voltage of the electrode H2 is changed from "Lo" to "Hi" (reference S41), so that the pixel signal E is outputted to the CDS circuit 16a through the output buffer 47 (reference S42), and the other pixel signals F, G, and H are horizontally transferred. The reset signal RS (reference S43) is outputted, so that the electric charges accumulated in the electric-charge/electric-voltage conversion capacitor 45 is reset. Then, the pixel signal F is outputted to the electric-charge/electric-voltage conversion capacitor 45 in accordance with the controls of the electrodes H1 and H2 (reference S44). By repeating such operations of the electrodes H1 and H2, the pixel signal G is transferred to the electric-charge/electric-voltage conversion capacitor 45, in which the pixel signals F and G are combined. The combined pixel signal FG is supplied to the CDS circuit 16a through the output buffer 47 (reference S45).

In the CDS circuit 16a, the pixel signal is sample-held in accordance with the sample hold signal S/H (reference S46). Namely, the combined pixel signal FG is outputted from the CDS circuit 16a (reference S47), and is inputted into the amplifier 16d. After the pixel signal FG is sample-held, the reset signal RS is outputted (reference S48), so that the electric charges accumulated in the electric-charge/electric-voltage conversion capacitance 45 is reset.

Similar to the above, the pixel signal H outputted from the horizontal transfer CCD 41 is supplied to the CDS circuit 16a through the output buffer 47 (reference S49). In the CDS circuit 16a, the pixel signal H is sample-held (reference S51) in accordance with the sample-hold signal S/H (reference S50), and is inputted into the amplifier 16d. After the pixel signal H is sample-held, the reset signal RS (reference S52) is outputted, so that the electric charges accumulated in the electric-charge/electric-voltage conversion capacitor 45 is reset.

As described above, in the third embodiment, two pixel signals, which are obtained by two photodiodes adjacent to each other in the CCD 12, are added to each other in the horizontal transfer CCD 41, and the combined signal is outputted from the CCD 12. Therefore, according to the third embodiment, since the image indicating device does not need to have a specific calculation circuit for adding pixel signals, the circuit construction is simple, so that the size of the circuit in the electronic camera is kept small, which is similar to the first and second embodiments.

FIGS. 31 through 39 show a fourth embodiment of the present invention. The circuit construction of the electronic camera of the fourth embodiment is the same as that of the second embodiment which is shown in FIG. 15.

Figure 31:
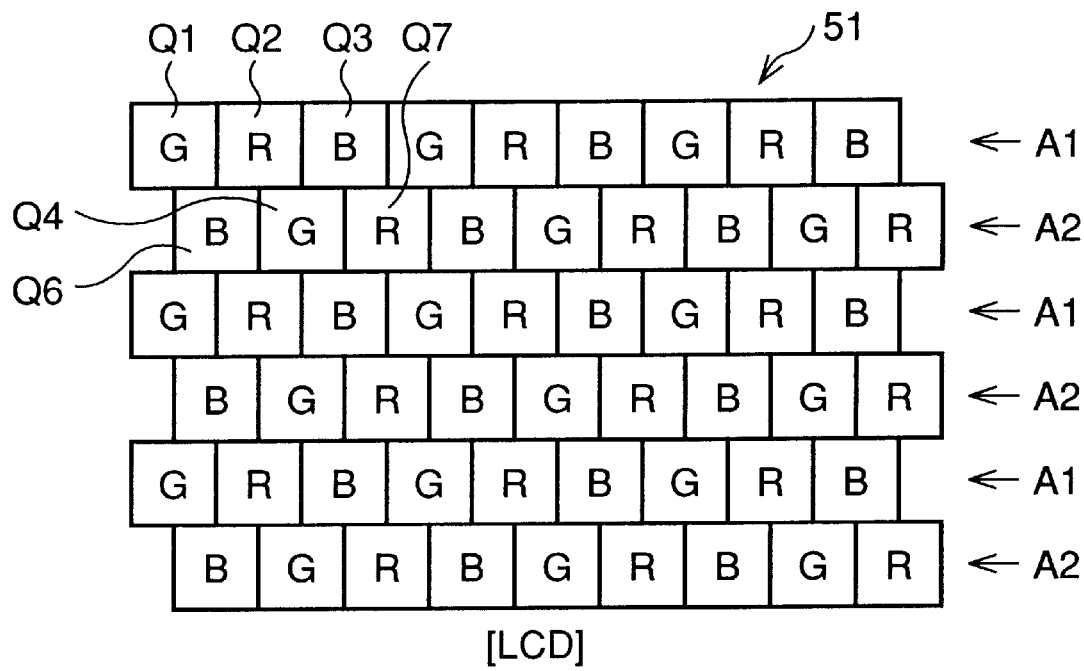
FIG. 31 is a view showing an arrangement of the color filter elements of the first color filter provided on the LCD in a fourth embodiment.
Figure 32:
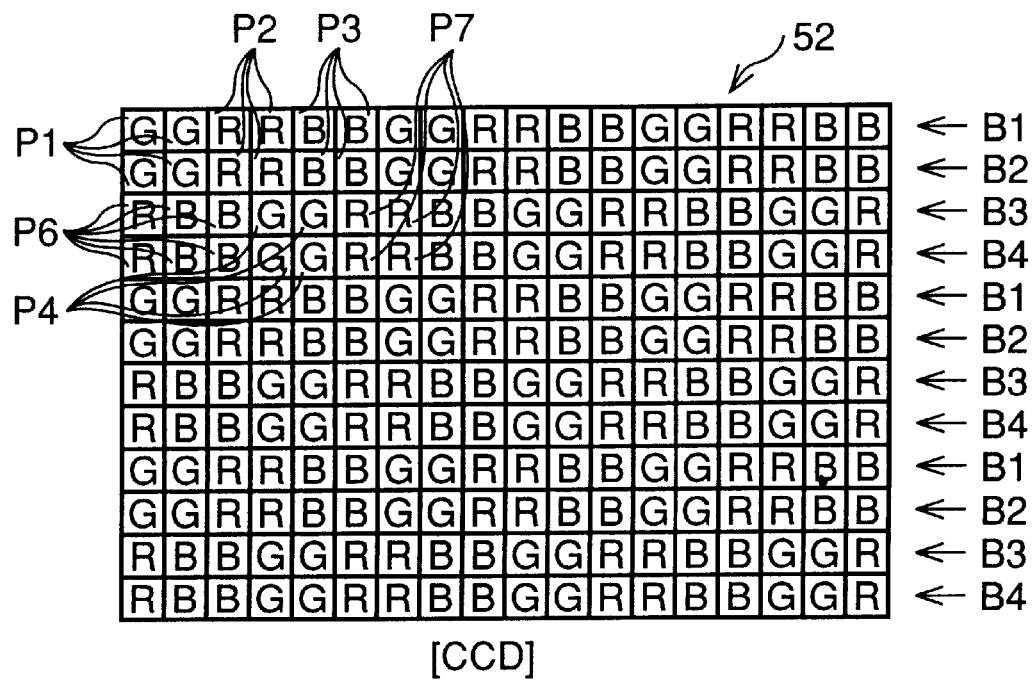
FIG. 32 is a view showing an arrangement of the color filter elements of the second color filter provided on the CCD in the fourth embodiment.

FIG. 31 shows an arrangement of the color filter elements of the first color filter 51 provided on the LCD 26, and FIG. 32 shows an arrangement of the color filter elements of the second color filter 52 provided on the CCD 12.

Similar to those of the first and second embodiments, the first color filter 51 is constructed according to the delta-arrangement.

In the CCD 12, the photodiodes are arranged in a matrix. The number of pixels i.e., photodiodes, is approximately four times the number of dots of the LCD 26. In first and second horizontal lines B1 and B2, the color filter elements are arranged in the order of G, G, R, R, B, B from left to right. In third and fourth horizontal lines B3 and B4, the color filter elements of R, B, B, G, G, and R are provided at portions directly below G, G, R, R, B, and B of the first and second horizontal lines B1 and B2. Namely, four color filter elements having the same color (e.g. R, shown by reference P2) in the first and second horizontal lines B1 and B2 are offset by one pixel in a horizontal direction relative to four color elements having the same color (e.g. G, shown by reference P4) in the third and fourth horizontal lines B3 and B4.

The first horizontal row A1 of the LCD 26 corresponds to the first and second horizontal lines B1 and B2 in the CCD 12, and the second horizontal row A2 of the LCD 26 corresponds to the third and fourth horizontal lines B3 and B4.

In the second color filter 52, the colors of color filter elements are the same for groups of four pixels which are adjacent to each other in a horizontal direction and a vertical direction. In the first and second horizontal lines B1 and B2, the color filter elements of the groups of four pixels shown by references P1, P2 and P3 are G, R and B, respectively. In the third and fourth horizontal lines B3 and B4, the color filter elements of the groups of four pixels shown by references P6, P4 and P7 are B, G and R, respectively.

Dots Q1, Q2, and Q3 on the first horizontal row A1 of the LCD 26 correspond to the pixels P1, P2, and P3 on the first and second horizontal lines B1 and B2 of the CCD 12. Dots Q6, Q4, and Q7 on the second horizontal row A2 correspond to the pixels P6, P4, and P7 on the third and fourth horizontal lines B3 and B4.

Figure 33:
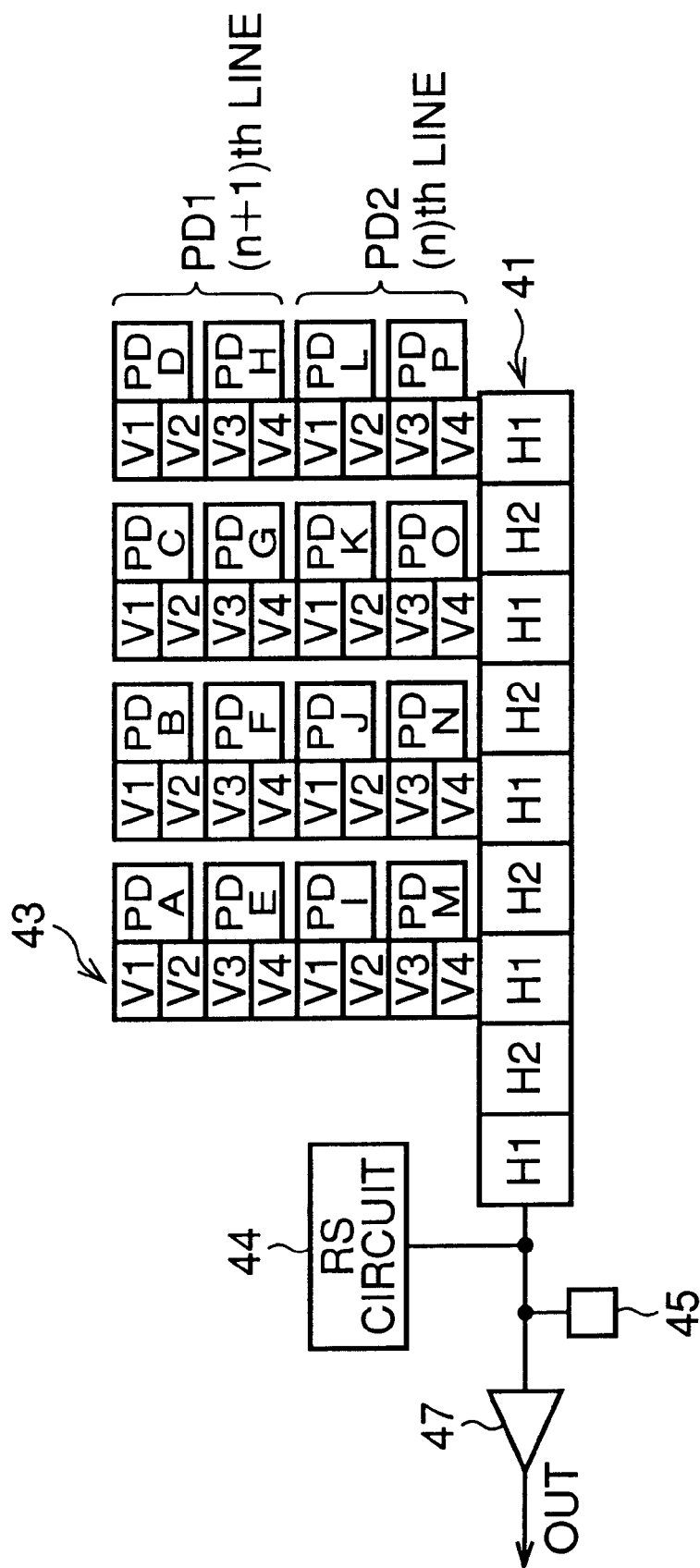
FIG. 33 is a view showing a construction of the CCD in the fourth embodiment.

FIG. 33 shows a construction of the CCD 12.

The CCD 12 has one horizontal transfer CCD 41. A dot signal of the (n+1)th horizontal row A1 on the LCD 26 is generated based on the pixel signals A, B, C, D, E, F, G, and H generated in the photodiodes PD1 which are aligned along two lines, each of which extends in a horizontal direction, and a dot signal of the (n)th horizontal row A2 on the LCD 26 is generated based on the pixel signals I, J, K, L, M, N, O, and P generated in the photodiodes PD2, which are aligned along two lines each of which extends in a horizontal direction.

A pair of electrodes V1 and V2, or electrodes V3 and V4 are connected to one photodiode PD, so that pixel signals A through P obtained by the photodiodes are independently transferred along the vertical transfer CCD 43, and are supplied to the horizontal transfer CCD 41.

Figure 34:
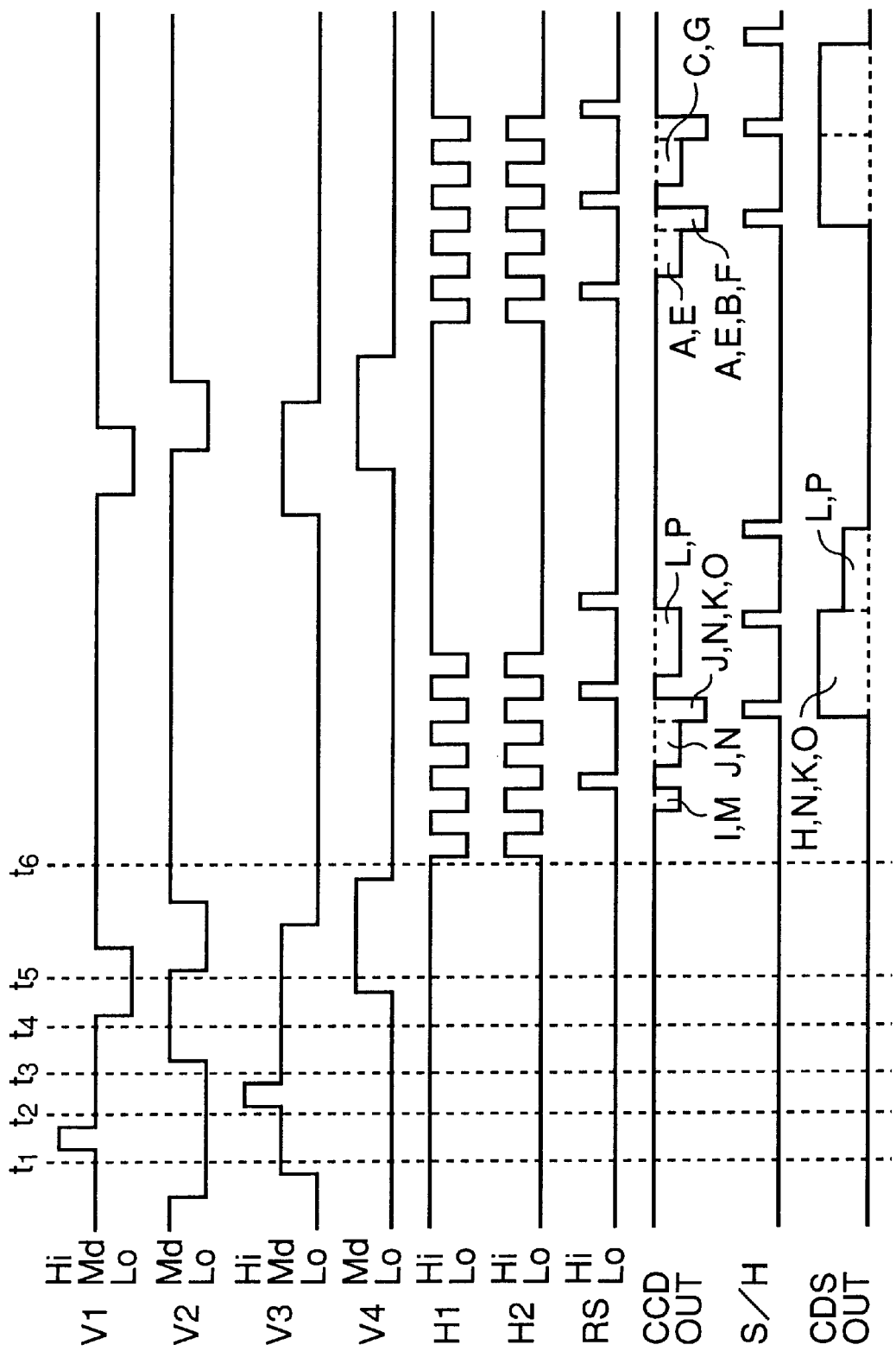
FIG. 34 is a timing chart showing that pixel signals are combined in the CCD and then the combined signal is transmitted to the amplifier, in a fourth embodiment.
Figure 35:
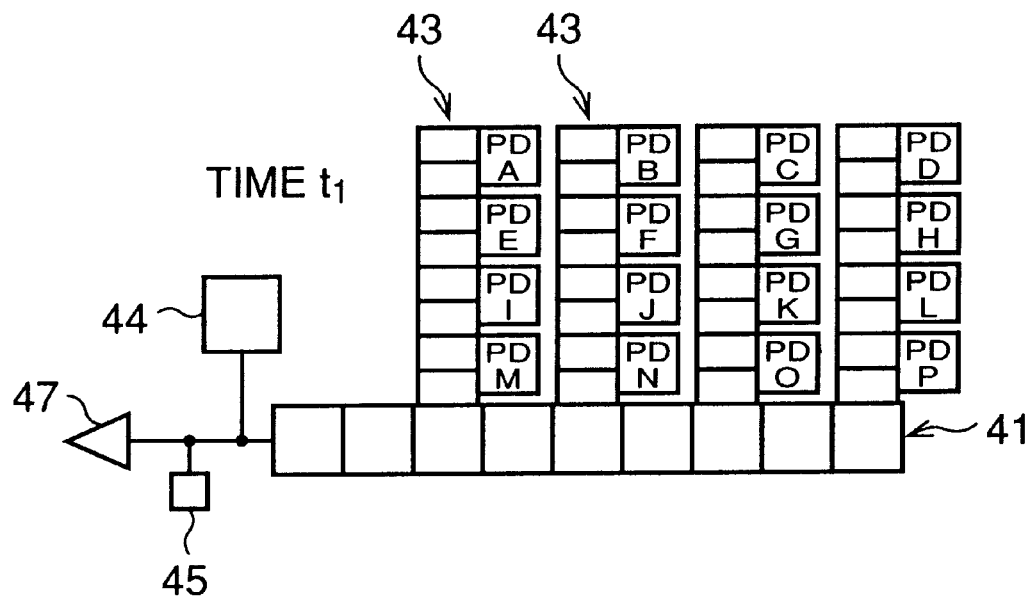
FIG. 35 is a view showing transfer conditions of the pixel signals at time $t_1$.
Figure 36:
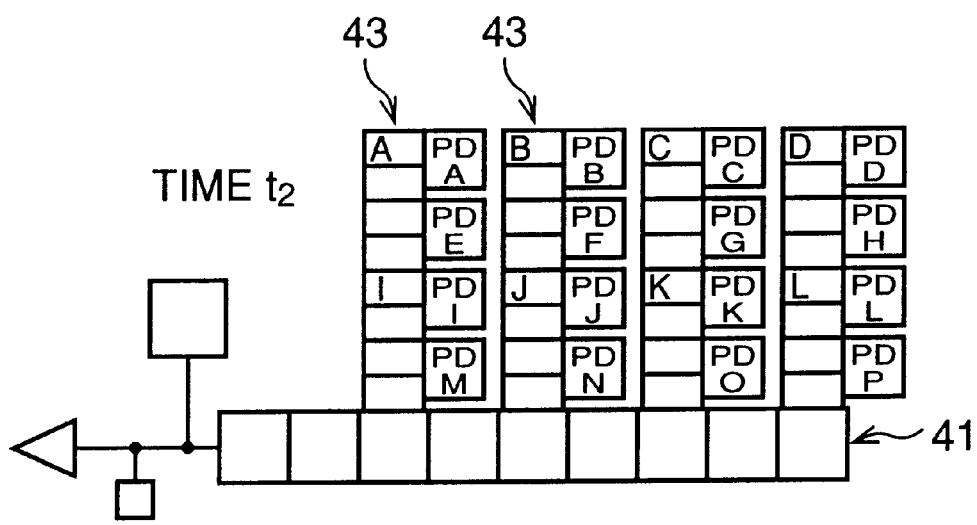
FIG. 36 is a view showing transfer conditions of the pixel signals at time $t_2$.
Figure 37:
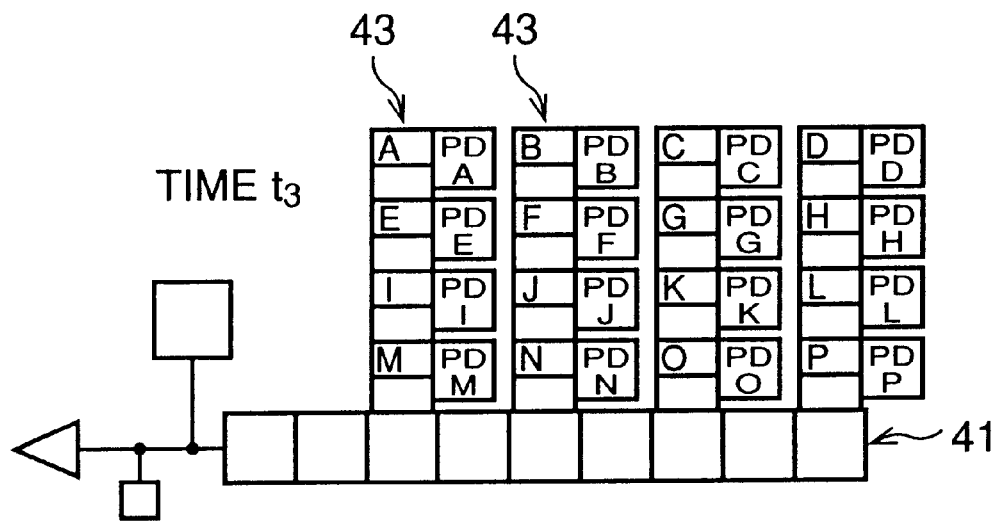
FIG. 37 is a view showing transfer conditions of the pixel signals at time $t_3$.
Figure 38:
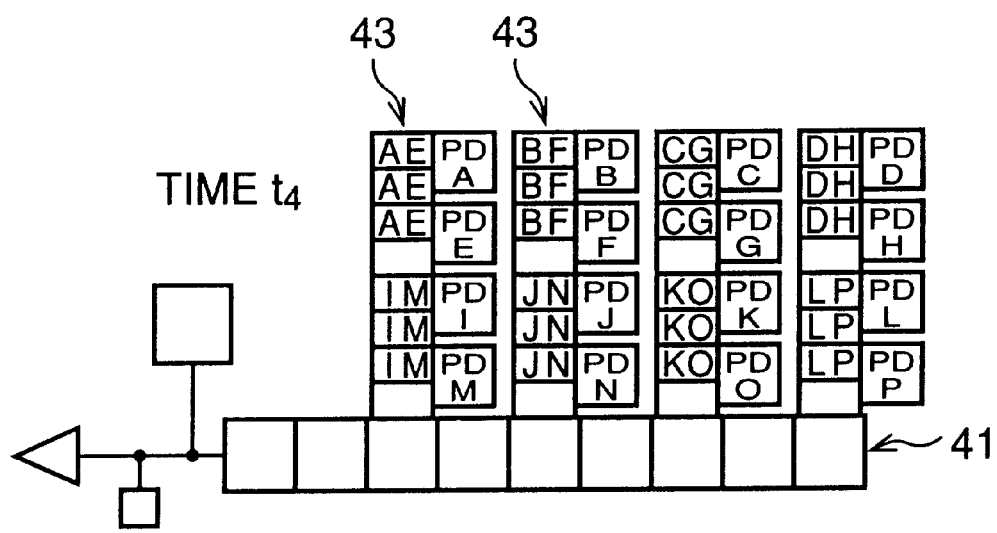
FIG. 38 is a view showing transfer conditions of the pixel signals at time $t_4$.
Figure 39:
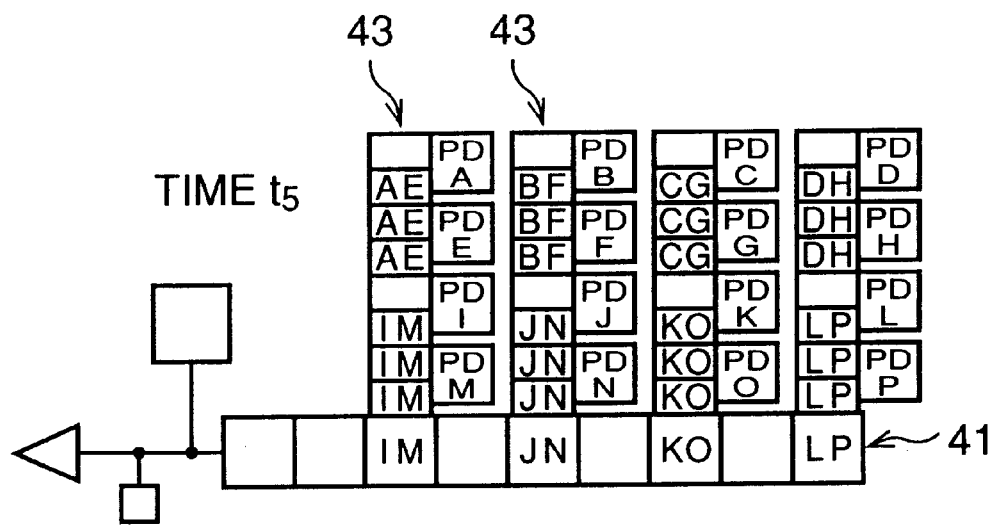
FIG. 39 is a view showing transfer conditions of the pixel signals at time $t_5$.
Figure 40:
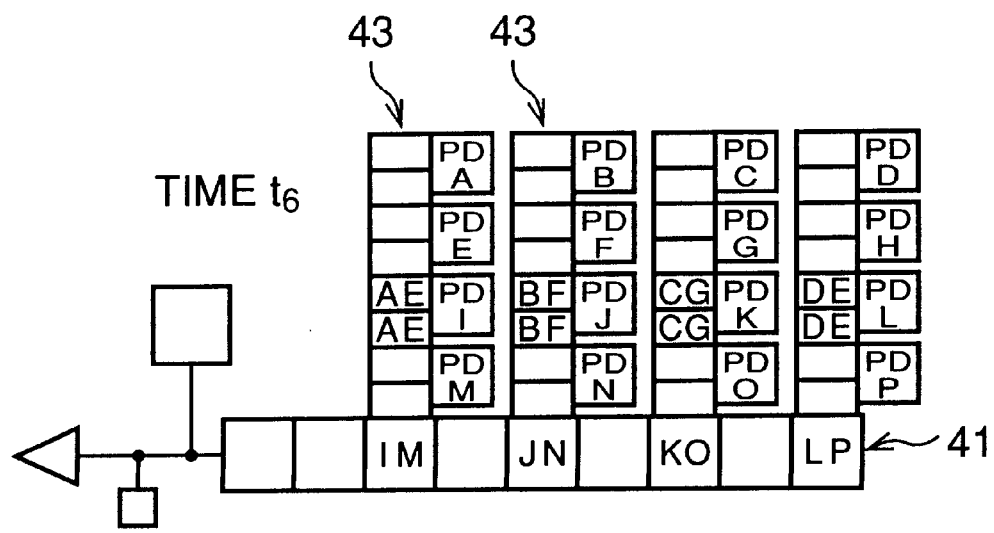
FIG. 40 is a view showing transfer conditions of the pixel signals at time $t_6$.

FIG. 34 is a timing chart showing that pixel signals are combined in the CCD 12, and that the combined signal is then transmitted to the amplifier 16d in the signal processing circuit 16. FIGS. 35 through 40 show transfer conditions of the pixel signals at times $t_1$ through $t_6$, respectively.

In the vertical transfer CCD 43, when a voltage signal, that is applied to each of the electrodes V1 and V3, is MIDDLE (Md), a potential well is formed at a portion corresponding to the electrode, and when the voltage signal applied is low (Lo), a potential well is not formed.

At time $t_1$, pixel signals generated by the photodiodes PD have not been transferred to the vertical transfer CCD 43. At times $t_1$ through $t_2$, the voltage of the electrode V1 is "Hi" and the voltages of the electrodes V2 through V4 are "Lo", and thus, pixel signals A, B, C, D, I, J, K, and L are transferred from the photodiodes PD to the vertical transfer CCD 43. At times $t_2$ through $t_3$, the voltage of the electrode V3 is "Hi" and the voltages of the electrodes V1, V2 and V4 are "Lo", so that pixel signals E, F, G, H, M, N, O, and P are transferred from the photodiodes PD to the vertical transfer CCD 43.

At time $t_4$, since the voltage of the electrode V2 has changed from "Lo" to "Md", potential wells are formed at portions corresponding to the electrodes V1 through V3, so that the pixel signals A and E are combined with each other. Similar to this operation, the pixels signals B and F, the pixels signals C and G, the pixels signals D and H, the pixels signals I and M, the pixels signals J and N, the pixels signals K and O, and the pixels signals L and P are combined, respectively.

At time $t_5$, since the voltage of the electrode V1 has changed from "Md" to "Lo" and the voltage of the electrode V4 has changed from "Lo" to "Md", potential wells are formed at portions corresponding to the electrodes V2 through V4, so that the combined pixel signals are transferred along the vertical transfer CCD 43 by one electrode. At this time, since the voltage of the electrode H1 of the horizontal transfer CCD 41 is "Hi", a potential well corresponding to the portion closest to the horizontal transfer CCD 41 in the vertical transfer CCD 43 is connected to a potential well of a portion corresponding to the electrode H1 of the horizontal transfer CCD 41, and thus, a part of the combined pixel signal IM is transferred to the horizontal transfer CCD 41.

At times $t_5$ through $t_6$, the vertical transfer is also carried out, and at time $t_6$, the voltage of the electrode V4 becomes "Lo", so that the horizontal transfer CCD 41 is isolated from the vertical transfer CCD 43, and thus, the combined pixel signals IM, JN, KO, and LP are kept in the horizontal transfer CCD 41.

After time $t_6$, the voltages of the electrodes H1 and H2 are intermittently changed to either "Hi" or "Lo", and the reset signal RS and the sample-hold signal S/H are outputted at predetermined timings, respectively. Thus, similar to the operation described with reference to FIG. 5, the pixel signals are outputted from the horizontal transfer CCD 41, and are subjected to a predetermined process in the signal process circuit 16.

According to the fourth embodiment, the same results obtained by the first through third embodiments can be obtained.

Figure 41:
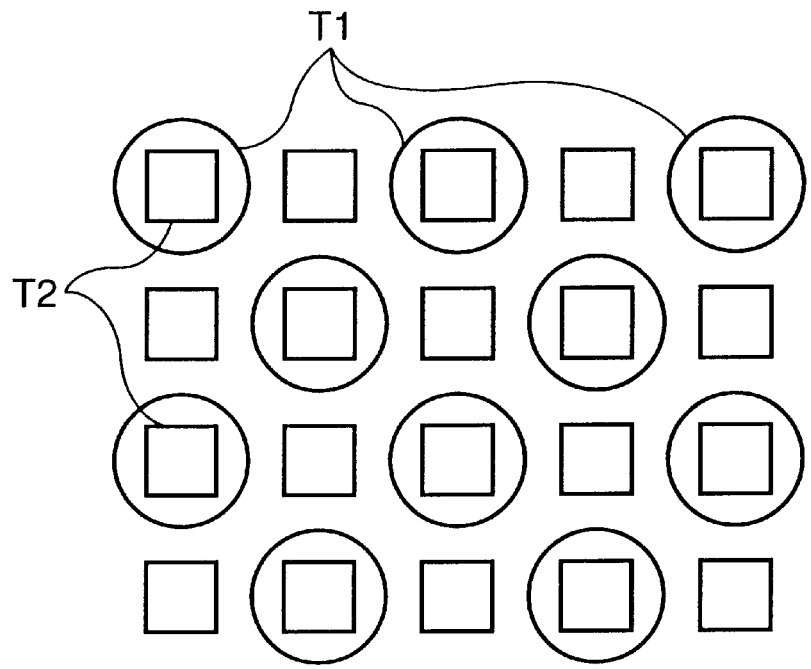
FIG. 41 is a view showing a relationship between a dot of the LCD and a pixel of the CCD in a fifth embodiment.

FIG. 41 shows a relationship between dots of the LCD 26, indicated by circles, pixels of the CCD 12, indicated by squares in a fifth embodiment. Dots T1 of the LCD 26 are arranged with the delta-arrangement which is similar to those of each of the embodiments described above. Pixels T2 of the CCD 12 are arranged in a matrix, and only pixels corresponding to dots T1 of the LCD 26 are used for indicating the image. In the fifth embodiment, each one of the pixels T2 of the CCD 12 that corresponds to one of the dots T1 of the LCD 26, is used independently.

Figure 42:
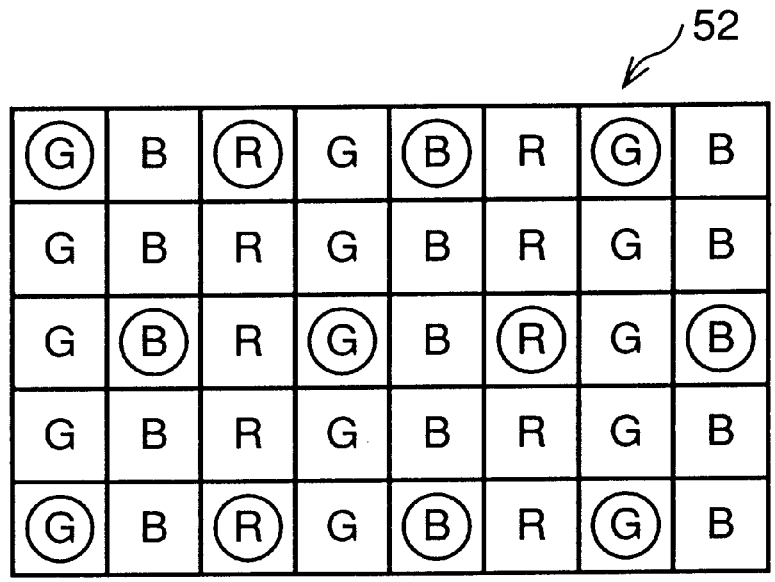
FIG. 42 is a view showing an example of a color filter provided on a CCD.
Figure 43:
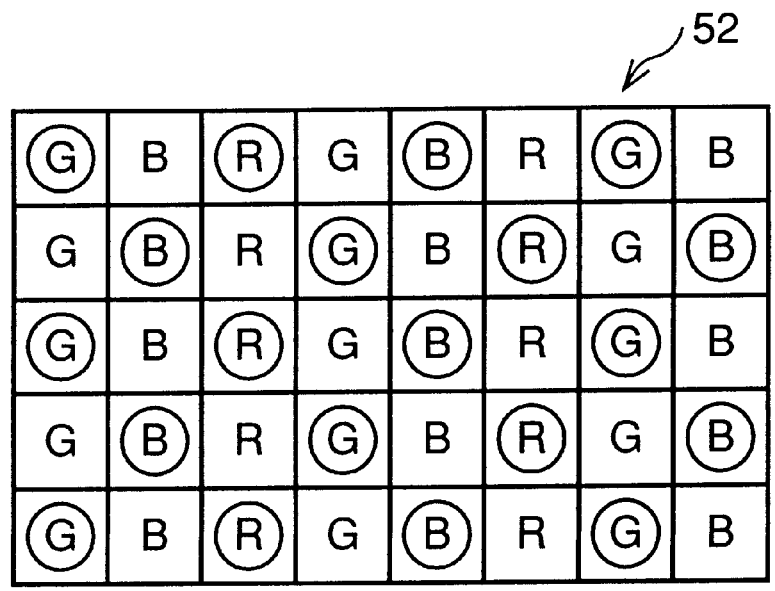
FIG. 43 is a view showing another example of a color filter provided on the CCD.

In the construction of the fifth embodiment, the color filter 52 provided on the CCD 12 is of a stripe-type as shown by FIGS. 42 and 43, in which a circle is applied to a reference indicating the color filter elements corresponding to the pixel signals used for indicating the image. The circuit structure of the electronic camera having the image indicating device of the fifth embodiment is the same as that shown in FIG. 15.

Figure 44:
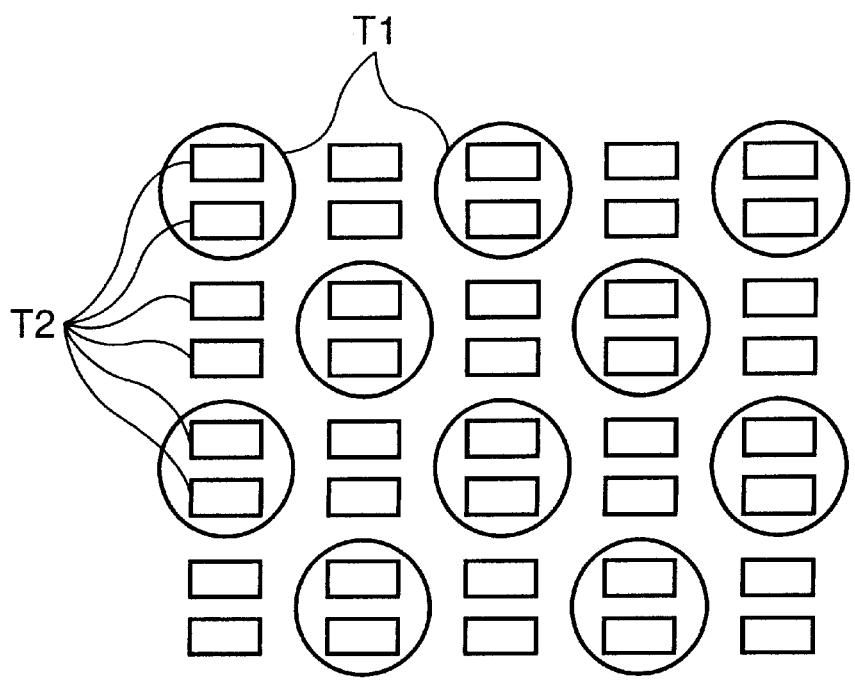
FIG. 44 is a view showing a relationship between a dot of the LCD and a pixel of the CCD in a sixth embodiment.

FIG. 44 shows a relationship between dots of the LCD 26, indicated by a circle, and pixels of the CCD 12, indicated by rectangles, in a sixth embodiment. Dots T1 of the LCD 26 are arranged with the delta-arrangement which is similar to those of each of the embodiments described above. Pixels T2 of the CCD 12 are arranged in a matrix, and only pixels corresponding to dots T1 of the LCD 26 are used for indicating the image. In the sixth embodiment, certain pairs of pixels T2 enclosed by circles indicating T1, of the CCD 12 correspond to dots T1 of the LCD 26, and the two pixel signals corresponding to the pairs of pixels T2 are combined with each other and outputted from the CCD 12.

The color filter 52 provided on the CCD 12 is of a stripe-type as shown by FIGS. 42 and 43, and is similar to that of the fifth embodiment. The circuit structure of the electronic camera having the image indicating device of the sixth embodiment is the same as that shown in FIG. 15.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-286421 (filed on Oct. 6, 1995) which is expressly incorporated herein by reference, in its entirety.

I claim:

1. A device for indicating an image, comprising:
   a display having dots by which an image is formed, said display being provided with a first color filter in which a color filter element of one of three different colors is disposed on each of said dots in such a manner that said three different colors are arranged in a delta-arrangement; and
   an imaging device having pixels arranged in a matrix, a number of said pixels being larger than a number of said dots, said imaging device being provided with a second color filter in which a color filter element of one of said three different colors is disposed on each of said pixels in such a manner that the colors of said color filter element of a group of adjacent pixels in said second color filter are the same, and the color of said color filter element of said group is the same as said color filter element of a corresponding dot of said display, a pixel being offset by one half of a pitch of one dot in the display the center-point between adjacent pixels corresponding to a dot in the display so that the three different colors of the group are arranged in a delta-arrangement which is coincident with said delta-arrangement of the display.

2. An image indicating device according to claim 1, wherein said display is a liquid crystal display.

3. An image indicating device according to claim 1, wherein said three different colors are three primary colors.

4. An image indicating device according to claim 1, further comprising means for transmitting pixel signals obtained by said imaging device to said display so that an image is indicated thereon.

5. An image indicating device according to claim 1, wherein said display and said imaging device are mounted in an electronic camera.

6. An image indicating device according to claim 1, wherein the number of adjacent pixels is two.

7. An image indicating device according to claim 1, wherein the number of adjacent pixels is four.

8. An image indicating device according to claim 1, wherein said a number of pixels provided in said imaging device is approximately an integer multiple of a number of said dots provided in said display.

9. An image indicating device according to claim 8, wherein said adjacent pixels on a first horizontal line are offset by one pixel in a horizontal direction in comparison with said adjacent pixels on a second horizontal line, in said imaging device.

10. An image indicating device according to claim 9, wherein said first horizontal row corresponds to a first horizontal line and a second horizontal line adjacent to said first horizontal line, said first and second horizontal lines being included in said imaging device, one of said adjacent pixels corresponding to said corresponding dot included in said first horizontal row being contained in said first horizontal line, the other of said adjacent pixels corresponding to said corresponding dot being contained in said second horizontal line.

11. An image indicating device according to claim 9, wherein said second horizontal row corresponds to a third horizontal line and a fourth horizontal line adjacent to said third horizontal line, said third and fourth horizontal lines being included in said imaging device, said adjacent pixels included in said third horizontal line being offset from said adjacent pixels included in said fourth horizontal line by one pixel in a horizontal direction.

12. An image indicating device according to claim 1, wherein said adjacent pixels are arranged in a vertical direction on a light receiving surface of said imaging device.

13. An image indicating device according to claim 12, wherein said adjacent pixels on a first horizontal line are offset by one pixel in a horizontal direction in comparison with said adjacent pixels on a second horizontal line, in said imaging device.

14. An image indicating device according to claim 1, wherein said adjacent pixels are arranged in a horizontal direction on a light receiving surface of said imaging device.

15. An image indicating device according to claim 1, wherein said adjacent pixels are arranged in a horizontal direction and a vertical direction on a light receiving surface of said imaging device.

16. An image indicating device according to claim 1, wherein said adjacent pixels are arranged in an oblique direction on a light receiving surface of said imaging device.

17. An image indicating device according to claim 1, wherein said adjacent pixels corresponding to dots included in a first horizontal row on said display are arranged in a vertical direction on said imaging device, and said adjacent pixels corresponding to dots included in a second horizontal row adjacent to said first horizontal row on said display are arranged in a horizontal direction on said imaging device.

18. A device for indicating an image, comprising:
a display having dots by which an image is formed, said dots being aligned in horizontal lines including odd numbered lines and even numbered lines, said dots contained in said odd numbered lines being offset from said dots contained in said even numbered lines by a half a width of one dot, a first color filter element of one of three different colors being disposed on each of said dots in such a manner that a color of any specified first color filter element is different form colors of six first color filter elements surrounding said specified first color filter element, the color filter elements thus being positioned so that the three different colors are arranged in a delta-arrangement; and
an imaging device having pixels arranged in a matrix, a second color filter element of one of said three different colors being disposed on each of said pixels in such a manner that colors of said second color filter element disposed on a group of adjacent pixels are the same, and a color of said second color filter element of said group of adjacent pixels is the same as said first color filter element of a corresponding dot of said display, the colors of the color filter element of the group thus being arranged in a delta arrangement which corresponds to the delta-arrangement on the display, said corresponding dot corresponding to a center-point of said group of adjacent pixels, a pixel being offset by one half of a pitch of one dot in the display, the center-point between adjacent pixels corresponding to a dot in the display device so that the three different colors of the group are arranged in the delta-arrangement which is coincident with the delta-arrangement of the display.

19. An imaging device, comprising:
photodiodes corresponding to pixels which are arranged in a matrix; and
a color filter comprising color filter elements having a plurality of first, second, and third groups, colors of said color filter elements of said first, second, and third groups being the same, respectively, said color filter elements included in each of said groups being provided on photodiodes which are adjacent to each other, said color filter elements being disposed on said pixels in such a manner that said first, second, and third groups are arranged in a sequential manner, according to color, in a horizontal direction, a center-point of each of said groups included in a first horizontal line being offset by at least one photodiode from a center-point of each of said groups included in a second horizontal line which is adjacent to said first horizontal line, the one photodiode offset being half of a pitch of one dot in a display device, the center-point between adjacent pixels corresponding to a dot in the display device so that the three different colors of the groups are arranged in a delta-arrangement which is coincident with a delta-arrangement of the display device.

20. An imaging device according to claim 19, further comprising a dot signal generator which combines pixel signals outputted from said photodiodes corresponding to each of said groups to generate one dot signal which corresponds to a smallest addressable unit of an image indicating device.

21. An imaging device according to claim 20, wherein said imaging device is a charge coupled device having one of a vertical transfer CCD and a horizontal transfer CCD, said dot signal generator being provided in said one of said vertical transfer CCD and said horizontal transfer CCD.

22. An imaging device according to claim 20, wherein each pixel signal generated in each of said photodiodes is independently read.

23. An imaging device according to claim 20, further comprising an electric-charge/electric-voltage conversion capacitor connected to said imaging device, said dot signal generator being included in said electric-charge/electric-voltage conversion capacitor.

24. An imaging device, comprising:
photodiodes corresponding to pixels which are arranged in a matrix; and
a color filter with color filter elements having a plurality of first, second, and third groups, colors of the color filter elements of the first, second, and third groups being the same, respectively, said color filter elements included in each of the groups being provided on photodiodes which are adjacent to each other, said color filter elements being disposed on said pixels in such a manner that said first, second, and third groups are arranged in a sequential manner, according to color, in a horizontal direction, a center-point of each of the groups included in a first and second horizontal lines being offset by at least one photodiode from a center-point of each of the groups included in a third horizontal line which is adjacent to the first and second horizontal lines and each of the groups included in the third horizontal line being offset by the at least one photodiode from a center point of each of the groups included in a fourth horizontal line which is adjacent to the third horizontal line, the at least one photodiode offset being half of a pitch of one dot of a display device, the center-point between adjacent pixels corresponding to a dot of the display device so that the three different colors are arranged in a delta-arrangement which is coincident with a delta-arrangement of the display device, each group in the first and second horizontal lines having color filter elements with identical colors being vertically adjacent, each group in the third and fourth horizontal lines having color filter elements with identical colors being horizontally adjacent.

25. The imaging device according to claim 24, further comprising a dot signal generator which combines pixel signals output from the photodiodes corresponding to each of the groups to generate one dot signal which corresponds to the dot of the display device.

26. The imaging device according to claim 25, wherein the imaging device is a charge coupled device having one of a vertical transfer CCD and a horizontal transfer CCD, the dot signal generator being provided in the one of the vertical transfer CCD and the horizontal transfer CCD.

27. The imaging device according to claim 25, wherein each pixel signal generated in each of the photodiodes is independently read.

28. The imaging device according to claim 25, further comprising an electric-charge/electric-voltage conversion capacitor connected to the imaging device, the dot signal generator being included in said electric-charge/electric-voltage conversion capacitor.

29. An imaging device, comprising:

photodiodes corresponding to pixels which are arranged in a matrix; and a color filter with color filter elements having a plurality of first, second, and third groups, colors of the color filter elements of the first, second, and third groups being the same, respectively, said color filter elements included in each of the groups being provided on photodiodes which are adjacent to each other, said color filter elements being disposed on said pixels in such a manner that said first, second, and third groups are arranged in a sequential manner, according to color, in a horizontal direction, a center-point of each of the groups included in a first pair of horizontal lines being offset by at least one photodiode from a center-point of each of the groups included in a second pair of horizontal lines which is adjacent to the first pair of horizontal lines, the at least one photodiode offset being half of a pitch of one dot of a display device, the center-point between adjacent pixels corresponding to a dot of the display device so that the three different colors are arranged in a delta-arrangement which is coincident with a delta-arrangement of the display device, each group in the first pair of horizontal lines having color filter elements with identical colors being vertically adjacent, each group in the second pair of horizontal lines having color filter elements with identical colors being obliquely adjacent.

* * * * *